(12) United States Patent
Duckett et al.

(10) Patent No.: US 11,521,000 B2
(45) Date of Patent: *Dec. 6, 2022

(54) INDUSTRIAL PRINTER

(71) Applicant: Avery Dennison Retail Information Services, LLC, Mentor, OH (US)

(72) Inventors: Jeanne F. Duckett, Franklin, OH (US); Richard D. Wirrig, Centerville, OH (US); Lance D. Neuhard, New Carlisle, OH (US); David J. Wimmers, Hamilton, OH (US); Larri B. Williams, Dayton, OH (US); James A. Makley, Springboro, OH (US); Jan M. Watson, Miamisburg, OH (US); Andrew R. Evans, Centerville, OH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,099

(22) Filed: May 17, 2021

(65) Prior Publication Data
US 2022/0012439 A1    Jan. 13, 2022

Related U.S. Application Data

(60) Continuation of application No. 16/816,792, filed on Mar. 12, 2020, now Pat. No. 11,010,571, which is a
(Continued)

(51) Int. Cl.
*G06K 7/10* (2006.01)
*G06K 17/00* (2006.01)
(Continued)

(52) U.S. Cl.
CPC .......... *G06K 7/10198* (2013.01); *B41J 2/335* (2013.01); *B41J 3/4075* (2013.01); *B41J 3/50* (2013.01);
(Continued)

(58) Field of Classification Search
CPC .......... G06K 7/10316; G06K 17/0025; G06K 19/0723; B41J 3/4075
(Continued)

(56) References Cited

U.S. PATENT DOCUMENTS

| 2,062,108 | A | 11/1936 | Rickerson |
| 3,967,092 | A | 6/1976 | Conta et al. |

(Continued)

FOREIGN PATENT DOCUMENTS

| CN | 1734460 | 2/2006 |
| CN | 1777895 | 5/2006 |

(Continued)

OTHER PUBLICATIONS

International Search Report and Written Opinion dated Jan. 4, 2016 issued in corresponding IA No. PCT/US2015/055404 filed Oct. 13, 2015.

(Continued)

*Primary Examiner* — Toan C Ly

(57) ABSTRACT

A high speed tabletop and industrial printer is disclosed with integrated high speed RFID encoding and verification at the same time. The industrial printer simultaneously prints on and electronically encodes/verifies RFID labels, tags, and/or stickers attached to a continuous web. The industrial printer comprises a lighted sensor array for indexing the printing to the RFID tags; and a cutter powered from the industrial printer for cutting the web that the RFID tags are disposed on. The industrial printer comprises two RFID reader/writers that are individually controlled. Specifically, one of the RFID reader/writers comprises the ability to electronically encode the RFID tags while the web is moving; and the second RFID reader/writer uses an additional RFID module and antenna on the printer for verifying the data encoded to the RFID tags.

27 Claims, 28 Drawing Sheets

Related U.S. Application Data division of application No. 14/882,194, filed on Oct. 13, 2015, now Pat. No. 10,592,794.

(60) Provisional application No. 62/063,258, filed on Oct. 13, 2014, provisional application No. 62/063,213, filed on Oct. 13, 2014, provisional application No. 62/063,238, filed on Oct. 13, 2014, provisional application No. 62/063,249, filed on Oct. 13, 2014, provisional application No. 62/063,227, filed on Oct. 13, 2014.

(51) Int. Cl.

| | |
|---|---|
| *G06K 19/07* | (2006.01) |
| *G06K 1/20* | (2006.01) |
| *G06K 5/00* | (2006.01) |
| *B41J 3/407* | (2006.01) |
| *B41J 3/50* | (2006.01) |
| *B41J 29/13* | (2006.01) |
| *G06K 1/00* | (2006.01) |
| *G06K 7/00* | (2006.01) |
| *B41J 2/335* | (2006.01) |
| *A63F 3/06* | (2006.01) |
| *B41J 2/36* | (2006.01) |
| *B41J 15/00* | (2006.01) |
| *B41M 5/00* | (2006.01) |

(52) U.S. Cl.
CPC ............... *B41J 29/13* (2013.01); *G06K 1/00* (2013.01); *G06K 1/20* (2013.01); *G06K 5/00* (2013.01); *G06K 7/00* (2013.01); *G06K 7/10227* (2013.01); *G06K 7/10316* (2013.01); *G06K 7/10366* (2013.01); *G06K 17/0025* (2013.01); *G06K 19/0723* (2013.01); *G06K 19/0725* (2013.01); *A63F 2003/066* (2013.01); *B41J 2/36* (2013.01); *B41J 15/00* (2013.01); *B41M 5/0052* (2013.01); *B41M 5/0094* (2013.01)

(58) Field of Classification Search
USPC ........................................................ 235/449
See application file for complete search history.

(56) References Cited

U.S. PATENT DOCUMENTS

| | | |
|---|---|---|
| 4,279,039 A | 7/1981 | Drew |
| 4,297,039 A | 10/1981 | Lees |
| 4,661,888 A | 4/1987 | Jewell et al. |
| 4,667,210 A | 5/1987 | Matsuura et al. |
| D362,673 S | 9/1995 | Yamamoto |
| 5,721,578 A | 2/1998 | Nakai et al. |
| 5,745,146 A | 4/1998 | Durst et al. |
| 5,779,372 A | 7/1998 | Jorgensen |
| 5,845,147 A | 12/1998 | Vishlitzky et al. |
| 6,045,275 A | 4/2000 | Hosoya |
| 6,236,486 B1 | 5/2001 | Nocker, IV |
| 6,409,401 B1 | 6/2002 | Petteruti et al. |
| 6,593,853 B1 | 7/2003 | Barrett |
| 6,963,351 B2 | 11/2005 | Squires et al. |
| D528,151 S | 9/2006 | Hattori |
| D528,587 S | 9/2006 | Nakaeda |
| 7,114,654 B2 | 10/2006 | Chapman et al. |
| 7,190,270 B2 | 3/2007 | Brown et al. |
| D579,043 S | 10/2008 | Hattori et al. |
| 7,481,371 B2 | 1/2009 | Heidorn |
| 7,612,672 B2 | 11/2009 | Choi et al. |
| 7,623,038 B2 | 11/2009 | Neuhard |
| 7,936,252 B2 | 5/2011 | Donato |
| D641,394 S | 7/2011 | Inada |
| 8,097,111 B2 | 1/2012 | Stern |
| 8,207,824 B2 | 6/2012 | Keeton et al. |
| 8,305,198 B2 | 11/2012 | Donato |
| 8,365,788 B2 | 2/2013 | Le |
| 8,393,540 B2 | 3/2013 | Alleshouse |
| 8,472,046 B2 | 6/2013 | Hoffman et al. |
| D689,542 S | 9/2013 | Klocke et al. |
| 8,544,740 B2 | 10/2013 | Torchalski et al. |
| D694,319 S | 11/2013 | Nakagawa |
| 2002/0094497 A1 | 7/2002 | Strijckers et al. |
| 2005/0025483 A1 | 2/2005 | Gurevich et al. |
| 2005/0029350 A1 | 2/2005 | Jusas et al. |
| 2005/0030201 A1 | 2/2005 | Bridgelall |
| 2005/0058483 A1 | 3/2005 | Chapman et al. |
| 2005/0116034 A1 | 6/2005 | Satake et al. |
| 2005/0139667 A1 | 6/2005 | Barrus et al. |
| 2005/0230478 A1 | 10/2005 | Chapman et al. |
| 2005/0274800 A1 | 12/2005 | Chapman et al. |
| 2006/0054681 A1 | 3/2006 | Park et al. |
| 2006/0054861 A1 | 3/2006 | Ionkin et al. |
| 2006/0058483 A1 | 3/2006 | Zha et al. |
| 2006/0071063 A1 | 4/2006 | Duckett |
| 2006/0071796 A1 | 4/2006 | Korzeniewski |
| 2006/0109496 A1 | 5/2006 | Brown et al. |
| 2006/0176152 A1 | 8/2006 | Wagner et al. |
| 2006/0221363 A1 | 10/2006 | Roth et al. |
| 2007/0010213 A1 | 1/2007 | Dewan |
| 2007/0013520 A1 | 1/2007 | Conwell et al. |
| 2007/0014615 A1 | 1/2007 | Kasayama et al. |
| 2007/0023516 A1 | 2/2007 | Chapman et al. |
| 2007/0046467 A1 | 3/2007 | Chakraborty |
| 2007/0125836 A1 | 6/2007 | McAllister et al. |
| 2007/0126558 A1 | 6/2007 | Donato |
| 2007/0127965 A1 | 6/2007 | Pagan et al. |
| 2007/0159330 A1 | 7/2007 | Chakraborty et al. |
| 2007/0279193 A1 | 12/2007 | Tanaka |
| 2007/0296554 A1 | 12/2007 | Marcus et al. |
| 2008/0001723 A1 | 1/2008 | Scheussler |
| 2008/0042830 A1 | 2/2008 | Chakraborty et al. |
| 2008/0074266 A1 | 3/2008 | Ohashi et al. |
| 2008/0074269 A1 | 3/2008 | Torchalski et al. |
| 2008/0136599 A1 | 6/2008 | Sugano et al. |
| 2008/0186177 A1 | 8/2008 | Nikitin et al. |
| 2008/0191848 A1 | 8/2008 | Saito et al. |
| 2008/0223233 A1 | 9/2008 | Barboza et al. |
| 2008/0266602 A1 | 10/2008 | Moriyama et al. |
| 2008/0293445 A1 | 11/2008 | Piippponen et al. |
| 2009/0031553 A1* | 2/2009 | Moriyama ............ G06K 17/00 29/600 |
| 2009/0032193 A1 | 2/2009 | Fukui et al. |
| 2009/0041527 A1 | 2/2009 | Ohashi et al. |
| 2009/0194588 A1 | 8/2009 | Blanchard, Jr |
| 2009/0307529 A1 | 12/2009 | Kim |
| 2010/0070305 A1 | 3/2010 | Eisenberg et al. |
| 2010/0102935 A1 | 4/2010 | Chaves et al. |
| 2010/0103238 A1 | 4/2010 | Neuhard et al. |
| 2010/0148964 A1 | 6/2010 | Broer |
| 2010/0182390 A1 | 7/2010 | Imaizumi |
| 2010/0309275 A1 | 12/2010 | Kokuta |
| 2010/0310261 A1 | 12/2010 | Matsushima |
| 2010/0319561 A1 | 12/2010 | Colquitt et al. |
| 2011/0007665 A1 | 1/2011 | Dinur |
| 2011/0169615 A1 | 7/2011 | Donato |
| 2012/0081747 A1 | 4/2012 | Kobayashi |
| 2012/0200654 A1 | 8/2012 | Arrington et al. |
| 2012/0218366 A1 | 8/2012 | Yamada et al. |
| 2013/0063253 A1 | 3/2013 | Rashid et al. |
| 2013/0161382 A1 | 6/2013 | Bauer et al. |
| 2014/0239058 A1 | 8/2014 | Furukawa et al. |
| 2014/0306018 A1 | 10/2014 | Berthaud et al. |
| 2015/0199591 A1 | 7/2015 | Negro et al. |
| 2015/0199594 A1 | 7/2015 | Kuniya |
| 2016/0063286 A1 | 3/2016 | Nikunen et al. |
| 2019/0392272 A1 | 12/2019 | Bauer et al. |

FOREIGN PATENT DOCUMENTS

| | | |
|---|---|---|
| CN | 1867451 | 11/2006 |
| CN | 1877602 | 12/2006 |
| CN | 101044497 | 9/2007 |

(56) References Cited

FOREIGN PATENT DOCUMENTS

| | | |
|---|---|---|
| CN | 101099160 | 1/2008 |
| CN | 101112009 | 1/2008 |
| CN | 101241539 | 8/2008 |
| CN | 101293431 | 10/2008 |
| CN | 101308545 | 11/2008 |
| CN | 101359375 | 2/2009 |
| CN | 101359376 | 2/2009 |
| CN | 101379509 | 3/2009 |
| CN | 101542505 | 9/2009 |
| CN | 101879817 | 11/2010 |
| CN | 202701297 | 1/2013 |
| CN | 104115164 | 10/2014 |
| CN | 110334792 | 10/2019 |
| EP | 2193926 | 6/2010 |
| EP | 2769336 | 8/2014 |
| FR | 2484917 | 12/1981 |
| GB | 201010531 | 8/2010 |
| JP | 61-13028 | 1/1986 |
| JP | 2003-200601 | 7/2003 |
| JP | 2010-0167613 | 8/2010 |
| JP | 2014-004803 | 1/2014 |
| JP | 1491367 | 3/2014 |
| WO | 2013/086307 | 6/2013 |

OTHER PUBLICATIONS

International Preliminary Report on Patentability dated Jan. 19, 2017 issued in corresponding IA No. PCT/US2015/055404 filed Oct. 13, 2015.
International Search Report and Written Opinion dated Jan. 4, 2016 issued in corresponding IA No. PCT/US2015/055402 filed Oct. 13, 2015.
International Preliminary Report on Patentability dated Jan. 13, 2017 issued in corresponding IA No. PCT/US2015/055402 filed Oct. 13, 2015.
International Search Report and Written Opinion dated Nov. 11, 2016 issued in corresponding IA No. PCT/US2016/034215 filed May 26, 2016.
International Preliminary Report on Patentability dated Dec. 5, 2017 issued in corresponding IA No. PCT/US2016/034215 filed May 26, 2016.
International Preliminary Report on Patentability dated Apr. 27, 2017 issued in corresponding IA No. PCT/US2015/055406 filed Oct. 14, 2015.
International Search Report and Written Opinion dated Jan. 4, 2016 issued in corresponding IA No. PCT/US2015/055406 filed Oct. 14, 2015.

* cited by examiner

INDUSTRIAL PRINTER

CROSS-REFERENCE TO RELATED APPLICATION(S)

The present application is a continuation of U.S. patent application Ser. No. 16/816,792 filed Mar. 27, 2020, which is a division of U.S. patent application Ser. No. 14/882,194 filed Oct. 13, 2015, now U.S. Pat. No. 10,592,794, which claims the benefit of U.S. Provisional Patent Application Nos. 62/063,258 filed Oct. 13, 2014, 62/063,213 filed Oct. 13, 2014, 62/063,249 filed Oct. 13, 2014, 62/063,238 filed Oct. 13, 2014, and 62/063,227 filed Oct. 13, 2014, all of which are incorporated herein by reference in their entireties.

BACKGROUND

The present invention relates generally to thermal tabletop and industrial printers with radio frequency identification (RFID) read/write capabilities. More particularly, the present disclosure relates to a high speed tabletop and industrial printer with integrated high speed RFID encoding and verification at the same time. The present disclosure includes a passive NFC I$^2$C inlay for the purpose of communication with the Printer's processor when using a NFC reader/encoder and a passive UHF, read by the embedded RFID Reader/Encoder, temperature inlay for the purpose of inputting the printer's temperature with the intention of using the temperature to improve printer operation.

Radio frequency identification (RFID) tags are electronic devices that may be affixed to items whose presence is to be detected and/or monitored. The presence of an RFID tag, and therefore the presence of the item to which the RFID tag is affixed, may be checked and monitored by devices known as "readers" or "reader panels." Readers typically transmit radio frequency signals to which the RFID tags respond. Each RFID tag can store a unique identification number. The RFID tags respond to reader-transmitted signals by providing their identification number and additional information stored on the RFID tag based on a reader command to enable the reader to determine identification and characteristics of an item.

Current RFID tags and labels are produced through the construction of an inlay which includes a chip connected to an antenna applied to a substrate. The inlay is then inserted into a single tag or label. These labels or tags are then printed by either conventional printing processes, such as flexographic processes, and then variable information may be printed either with the static information or singularity. The chips are then encoded in a printer which has a read/encoding device or separately by a reader/encoding device normally in a stop to encode process. This method is slow and costly due to multiple steps that are involved in the manufacture of the product. In addition, such a method can only be accomplished typically one tag or label at a time per lane of manufacturing capability. This can result in higher cost, limited output, and limited product variation in terms of size, color, and complexity.

Thus, there exists a need for an RFID printer that is capable of both printing on record members, such as labels, tags, etc., and capable of encoding, or writing to and/or reading from an RFID transponder contained on the record member, as well as verifying the data encoded to the RFID tags.

The present invention discloses a high speed tabletop and industrial printer with integrated high speed RFID encoding and verification at the same time. The industrial printer comprises two RFID reader/writers that are individually controlled, such that the industrial printer can encode and verify at the same time. Specifically, one of the RFID reader/writers encodes RFID tags while the web is moving; and the second RFID reader/writer verifies the data encoded to the RFID tags.

The present invention discloses a high speed tabletop and industrial printer with an integrated NFC I$^2$C connected to the main processor of the printer. This chip enables an NFC transmitter to communicate with the printer's main processor to impact the operation of the printer.

The present invention discloses a RFID printer encoder that includes a UHF temperature inlay for the purpose of using the operating temperature of the printer to improve the performance of the printer read by the embedded RFID printer/encoder.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a high speed tabletop and industrial printer with integrated high speed RFID encoding and verification at the same time. Specifically, the industrial printer simultaneously prints on and electronically encodes/verifies RFID labels, tags, and/or stickers attached to a continuous web. The industrial printer comprises a lighted sensor array for indexing the printing to the RFID tags; and an optional cutter powered from the industrial printer for cutting the web that the RFID tags are disposed on.

In a preferred embodiment, the industrial printer comprises two RFID reader/writers that are individually controlled, such that the industrial printer can encode and verify at the same time. Specifically, one of the RFID reader/writers comprises the ability to electronically encode the RFID tags while the web is moving; and the second RFID reader/writer uses an additional RFID module and antenna on the printer for verifying the data encoded to the RFID tags.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
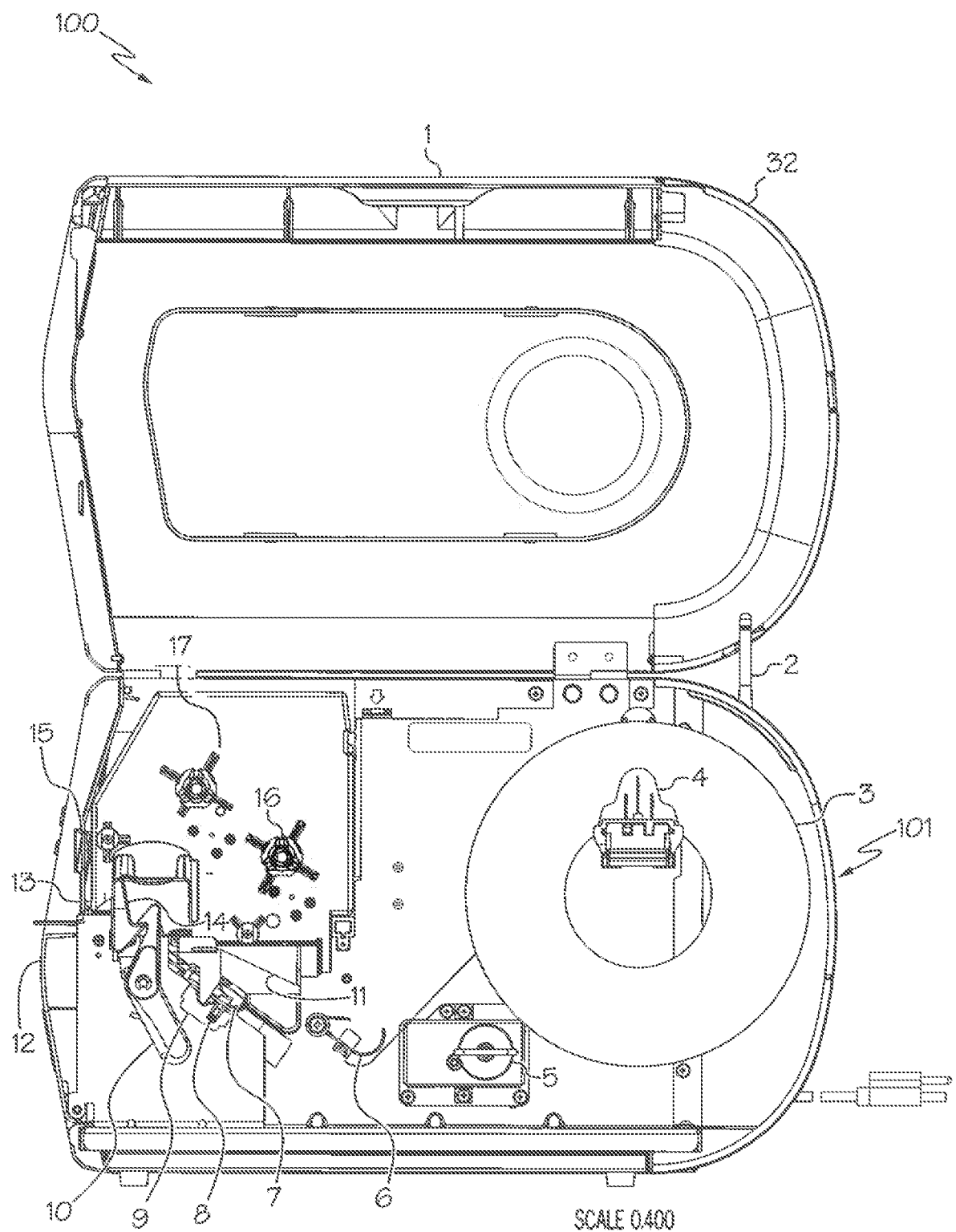
FIG. 1 illustrates a front, perspective view of a thermal tabletop and industrial printer opened to reveal internal components in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a high speed tabletop and industrial printer with integrated high speed RFID encoding and verification at the same time. The industrial printer is capable of both printing on record members, such as labels, tags, etc., and capable of encoding from an RFID transponder contained on the record member, as well as verifying the data encoded to the RFID tags. The industrial printer comprises two RFID reader/writers that are individually controlled, such that the industrial printer can encode and verify at the same time. Specifically, one of the RFID reader/writers encodes RFID tags while the web is moving; and the second RFID reader/writer verifies the data encoded to the RFID tags.

Referring initially to the drawings, FIG. 1 illustrates a thermal tabletop and/or industrial printer device 100 with integrated high speed RFID encoding and verification. The thermal tabletop and/or industrial printer 100, comprises a reader and/or encoding device, as well as a verification device. The reader and/or encoding device can read and program an RFID device, such as a RFID chip, that is contained in an inlay which may or may not be incorporated into a label, tag, or any other desired product, and which can also print onto the product without damaging or otherwise undesirably affecting the RFID device. The inlay may also be affixed directly to the product without necessarily being incorporated into a label or tag, such as through use of an adhesive to affix the inlay to the product.

In some exemplary embodiments, the products can be arranged into sheets or rolls, and multiple products can be printed, encoded, or verified at one time, in a sequential manner, simultaneously or substantially simultaneously. In some exemplary embodiments, reader and chip/antenna configurations can allow the encoding and verification to occur in line, so that printing, encoding, variable data imaging, verifying, and finishing can all be completed in one continuous process. As used herein a continuous process includes both a roll to roll configuration, and a sheet fed process in which there is no stopping of the process. Continuous may also include a slight incremental stopping, indexing, advancing or the like which does not last longer than a couple of seconds.

Furthermore, a cutter (not shown) can also be included in the printer 100. The cutter would be used to cut the web being printed on and the RFID tags disposed thereon. Typically, the cutter would be powered from the printer 100, or can be powered by any suitable means as is known in the art.

Printing as provided herein may be accomplished by using any number of processes, including impact and non-impact printers, flexographic, gravure, ink jet, electrostatic and the like just to provide some representative examples. Static printing may include company logos, manufacturers' information, size, color and other product attributes. Variable printing may include identification numbers, bar codes, pricings, store location and such other information as a retailer may decide is required.

Exemplary RFID devices, e.g. inlays, tags, labels and the like are available from Avery Dennison RFID Company and Avery Dennison Retail Information Services of Clinton, S.C. and Framingham, Mass., respectively. Such devices may be provided in any number of antenna and size configurations depending on the needs or end-use applications for which the product is intended. FIGS. 1-7 disclose multiple views of the industrial printer 100, and are described below. The printer 100 can be any suitable size, shape, and configuration as is known in the art without affecting the overall concept of the invention. One of ordinary skill in the art will appreciate that the interior and/or exterior shape of the printer 100 as shown in FIGS. 1-7 is for illustrative purposes only and many other shapes of the printer 100 are well within the, scope of the present disclosure. Although dimensions of the printer 100 (i.e., length, width, and height) are important design parameters for good performance, the printer 100 may be any shape that ensures optimal high speed encoding and verification.

Figure 11:
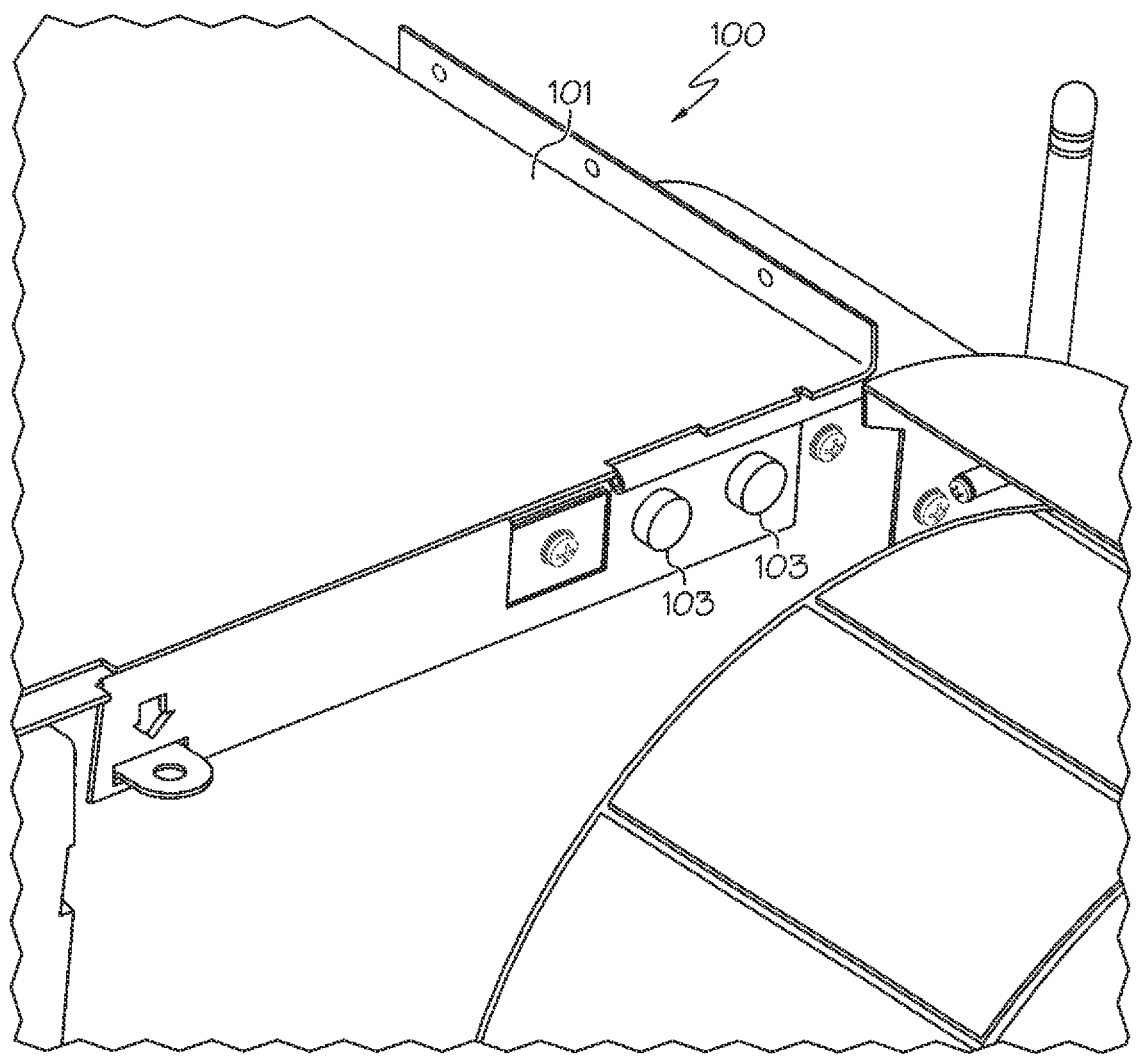
FIG. 11 illustrates a printer cover of the thermal tabletop and industrial printer comprising thumb screws in accordance with the disclosed architecture.

Generally referring to FIG. 1, the thermal tabletop and industrial printer 100 has a generally rectangular shape with a printer cover 101. However, tabletop printer covers can be cumbersome to remove when standard screws are used to fasten the cover down. Thus, in a preferred embodiment, the standard screws are replaced with thumb screws 103 (as shown in FIG. 11). The thumb screws 103 can be any suitable thumb screw 103 as is known in the art, and allow a user to easily remove the printer cover 101 whenever necessary without need of a screwdriver or other such tool. Further, the printer 100 comprises a front door 12 and handle 1. The front door 12 can be actuated via the handle 1 to provide access to the front of the printer 100 and to load supplies. Once the front door 12 is opened, the user installs the supply roll 3 on the supply roll holder 4.

Figure 6:
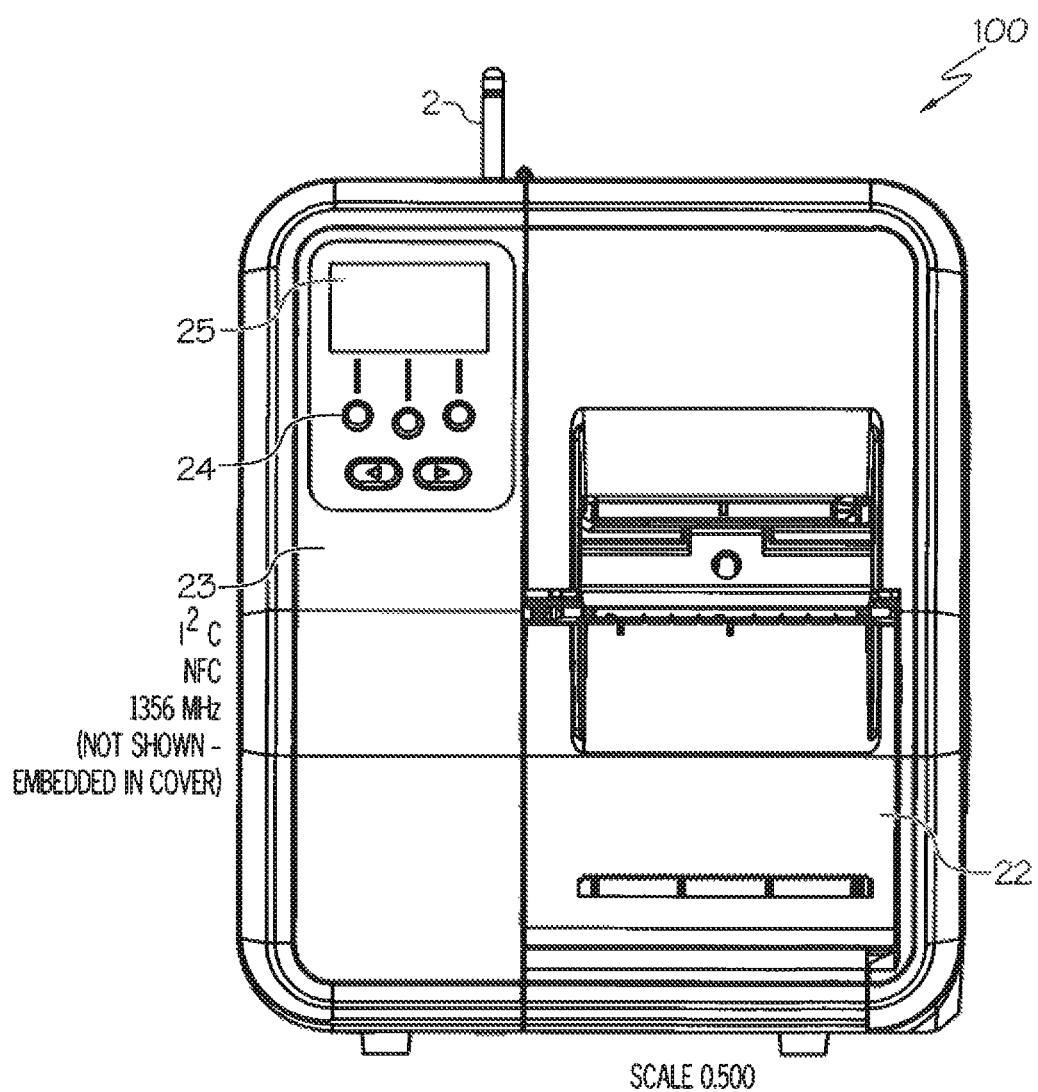
FIG. 6 illustrates a left, perspective view of the thermal tabletop and industrial printer in accordance with the disclosed architecture.

The present invention contemplates that communication to the printers main processor can use Near Field Communication (HF RFID) for both forward and reverse data (not related to encoding, e.g. error display data, print jobs, printer settings) shown in FIG. 6 (23).

The supply roll 3 contains supplies for the printer 100 to print on. One configuration for the supplies is a pressure sensitive label comprising of a face sheet, adhesive layer and liner paper. After dispensing the labels, the liner take-up 5 acts as a rewind holder for spent liner from adhesive backed labels.

Furthermore, the printer 100 comprises a supply damper 6 that helps to remove vibration from the supply roll 3 to improve print quality. And, an out of stock switch 7 provides an on/off indication if supplies are loaded in the printer 100, or if the printer 100 is in need of supplies. A supply guide or frame 8 holds and centers supplies. Further, an array sensor (shown in FIG. 2 as 35) is attached to the supply guide 8 to detect and accommodate minor variations in aperture location. An upper guide 11 guides supplies within the printer 100, and a loading label 18 (see FIG. 2) is a label indicating the supply path for users to load supplies into the printer 100. In one embodiment, the upper guide 11 includes a lighted paper path to illuminate the supplies for the user. The printer further comprises a print head 14. The print head 14 is a thermal print head such that the printer 100 automatically detects dot density and the location of failed heating elements. Additionally, the printer comprises a print head holder 15 which is a cast aluminum piece that the print head 14 is installed on to secure the print head 14 in place. Further a release handle 10 opens the printhead 14 and the printhead release tabs 36 (see FIG. 2) release printhead 14 from holder 15 when needed for servicing. The printer 100 also comprises a ribbon spindle 16 and a ribbon take-up 17. The ribbon spindle 16 is a DC motor-controlled supply for ribbon, and the ribbon take-up 17 is a DC motor-controlled takeup for ribbon. Further, a wireless antenna 2 is also included within the printer 100. The wireless antenna 2 is an 802.11 b/g/n dual band antenna for communicating with a router or other device. Additionally, the printer comprises two other intention transmitting antennas and 2 passive RFID antennas. An RFID antenna 9 to allow for the RFID encoding of supplies, and an RFID verifier 13, which is an external antenna for reading RFID supplies. It is noted that the power used to on the second RFID module controlling the verify antenna can be either the read power from the first RFID module, the write power from the RFID encode module or another optimum value. I$^2$C NFC 1356 MHz antenna is attached to the main processor contained on 29. Underneath the supply guides 8 is a UHF Temperature Sensor 37 whereas RFID Encoder Antenna 34 can be used to read the operating temperature of the printer.

Figure 2:
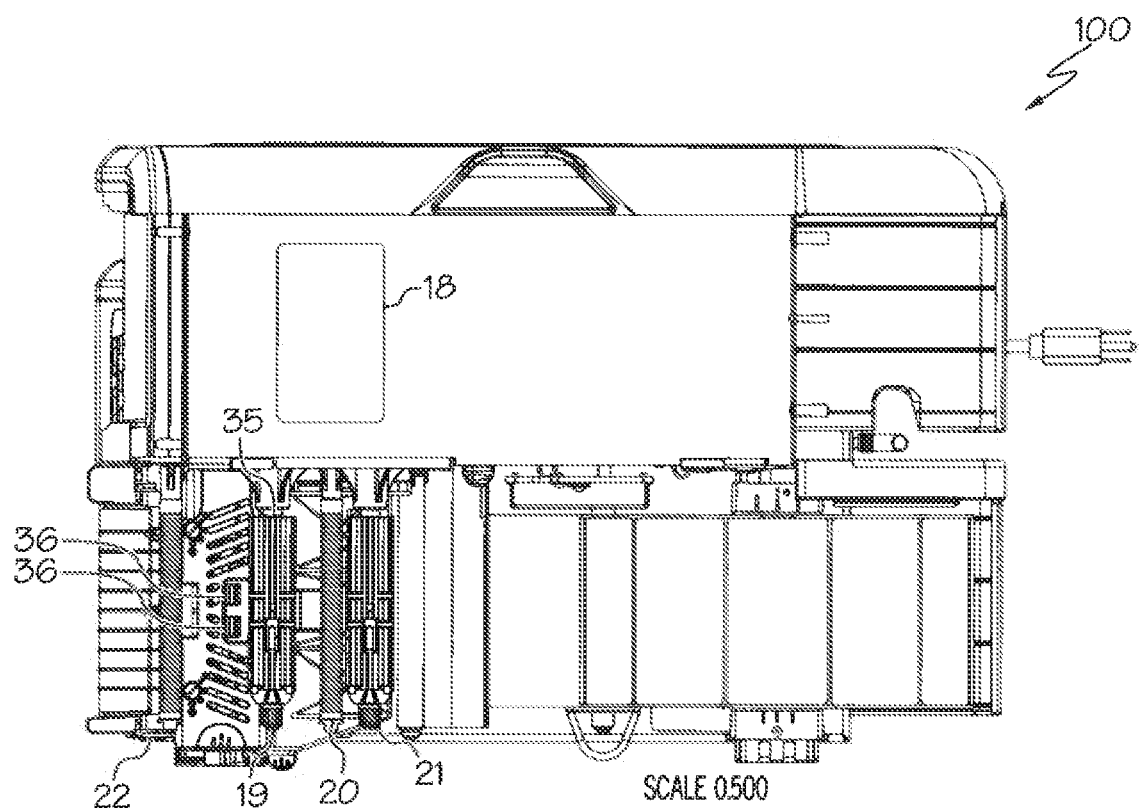
FIG. 2 illustrates a top, perspective view of the thermal tabletop and industrial printer in accordance with the disclosed architecture.

Generally referring to FIG. 2, the printer 100 comprises an overhead LED (light emitting diode) door 19 which covers the overhead LED board 20 which is a reflective supply sensor LED. Further, the printer includes an LED cap 21 which is a reflective supply sensor reflector, and an index sensor 35 which is a unique array sensor that automatically detects aperture sense marks. The index sensor 35 comprises a sensor cap 19. Print head release tabs indicated by reference numeral 36 are illustrated in FIG. 2 to aid in easy release of the print head 14. Specifically, the lighted sensor array 35 provides a lighted supply path 22 that automatically senses the position of holes disposed through the web which are used for sense marking, and correctly indexes the printing to the RFID tags. By using the sensor array 35, the printer 100 can determine which of the individual sensors within the array should be used for the indexing to account for manufacturing variations in the placement of the aperture.

Figure 3:
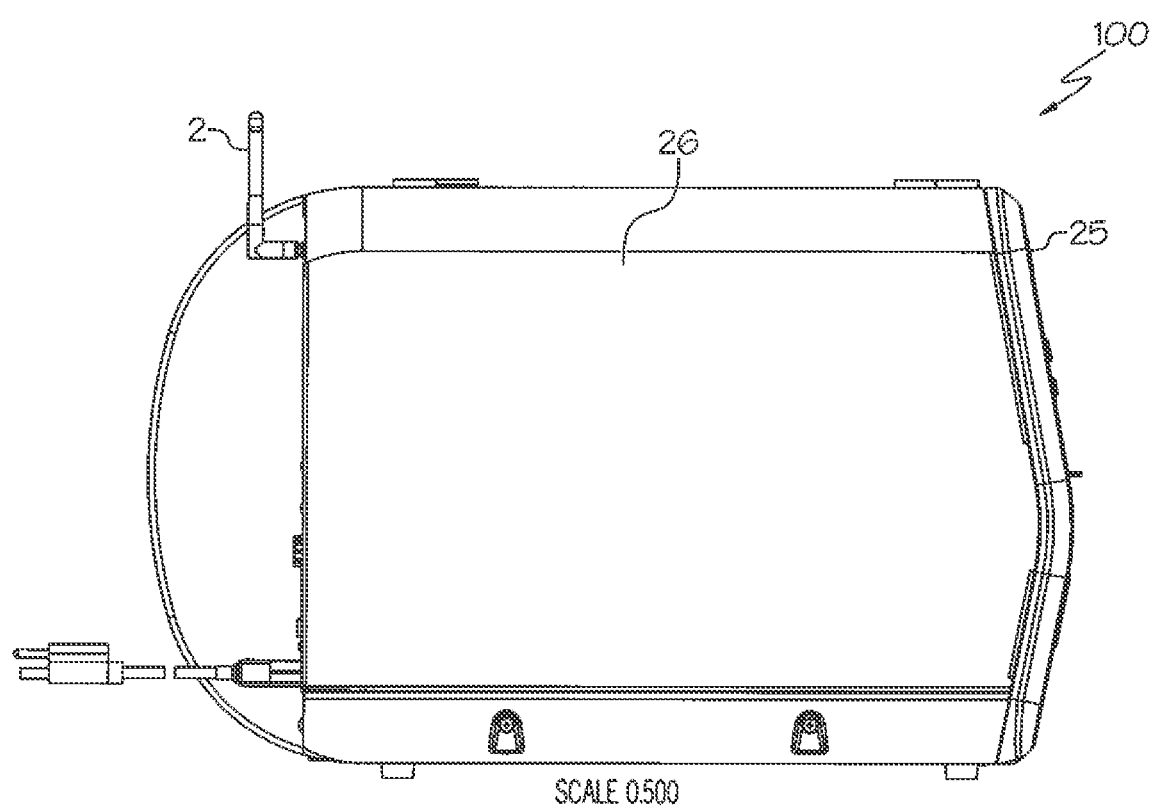
FIG. 3 illustrates a back, perspective view of the thermal tabletop and industrial printer with a cover on in accordance with the disclosed architecture.
Figure 4:
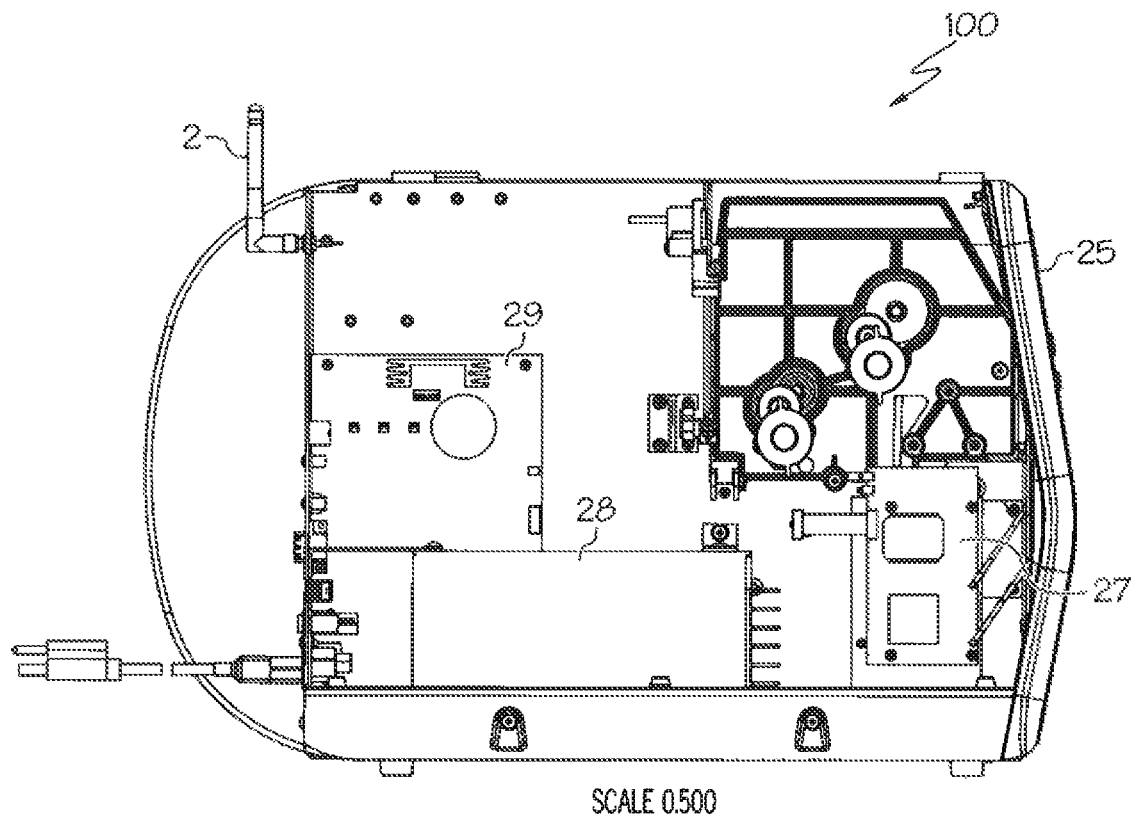
FIG. 4 illustrates a back, perspective view of the thermal tabletop and industrial printer without the cover in accordance with the disclosed architecture.

Generally referring to FIG. 3, the back of the printer 100 comprises a back cover 26 that covers the electronics panel (shown in FIG. 4). A display panel 25 displays a user interface, and the wireless antenna 2 (as shown in FIG. 1) can also be seen on the back of the printer 100. Generally referring to FIG. 4, the back of the printer 100 is shown without the cover 26. A CPU board 29 or main PC board is shown, as well as an RFID I/O board 27 which is a module that contains both the encoding and verification modules. A power supply 28 which is the main supply for power in the printer 100 is also shown at the back of the printer 100. Furthermore, the display panel 25 (as shown in FIG. 3), and the wireless antenna 2 (as shown in FIG. 1) can both be seen in FIG. 4 as well.

Figure 5:
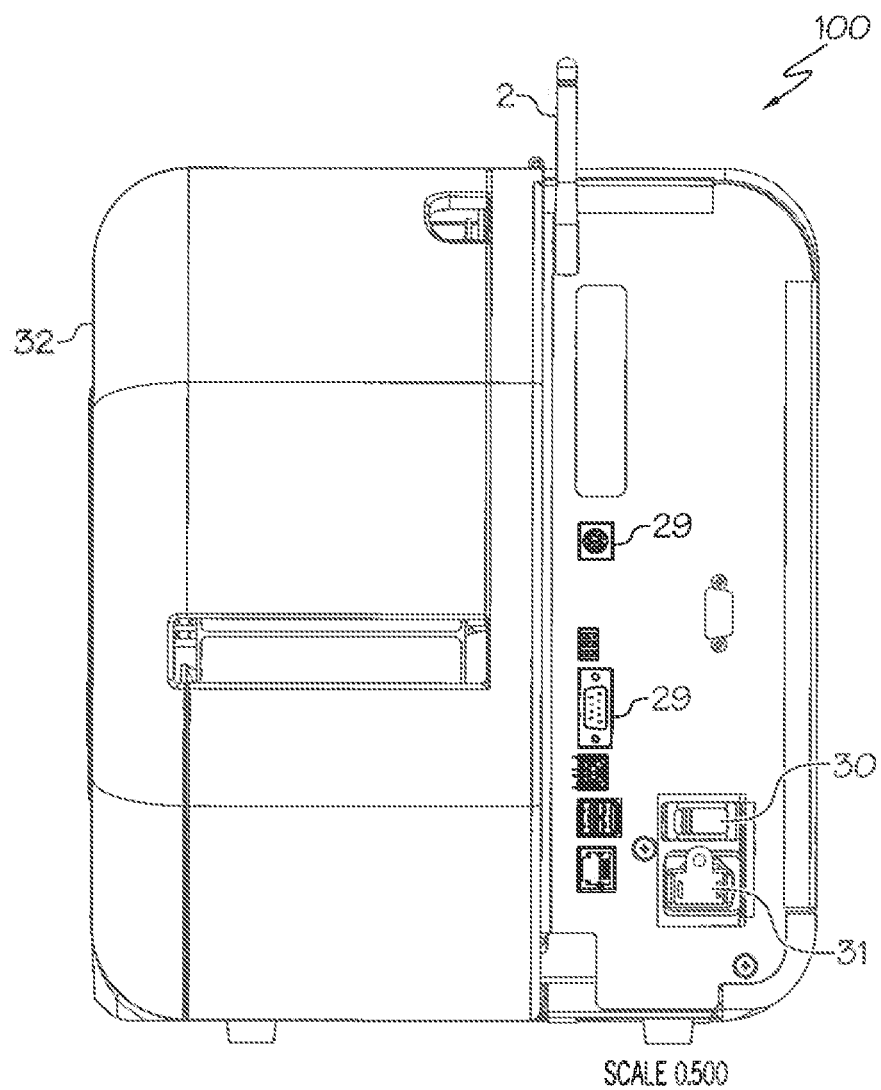
FIG. 5 illustrates a right, perspective view of the thermal tabletop and industrial printer in accordance with the disclosed architecture.

Generally referring to FIG. 5, the right side of the printer 100 is shown. The right side of the printer 100 shows the access door 32, as well as the wireless antenna 2 (as shown in FIG. 1). Further, the CPU board 29 (as shown in FIG. 4) is shown, as well as an I/O switch 30 and an I/O outlet 31. Generally referring to FIG. 6, the left side of the printer 100 is shown. The left side of the printer 100 shows the wireless antenna 2 (as shown in FIG. 1), as well as a supply exit door 22 that secures and allows access to the supply roll 3. Further, a NFC I2C chip 23 is also disclosed which provides unique capability to the printer 100 and allows the printer 100 to communicate directly with the main processor through a bridge. Finally, the printer 100 comprises a display panel 25 which includes a keypad 24.

In a preferred embodiment, the printer 100 includes a plurality of keys including the keypad 24 and a trigger key (not shown). The keypad 24 may be utilized to enter alpha-numeric data to the printer 100. Alternatively, the keypad 24 may have only a limited number of keys that are actuable in accordance with information depicted on the display 25 for selecting a number of operations of the printer, for example, feeding a web of record members through the printer 100, displaying status information, etc. The trigger key may be actuable by a user in various modes of the printer 100 to actuate the printing system and/or a RFID read/write module 34. Alternatively, one or more of these devices can be actuated automatically by a controller of the printer 100 in accordance with a stored application program. In addition to displaying status information or data entered via the keypad 24, the display 25 may also be controlled to provide prompts to the user to actuate the trigger key and/or other keys so as to control various operations of the printer 100.

Figure 7:
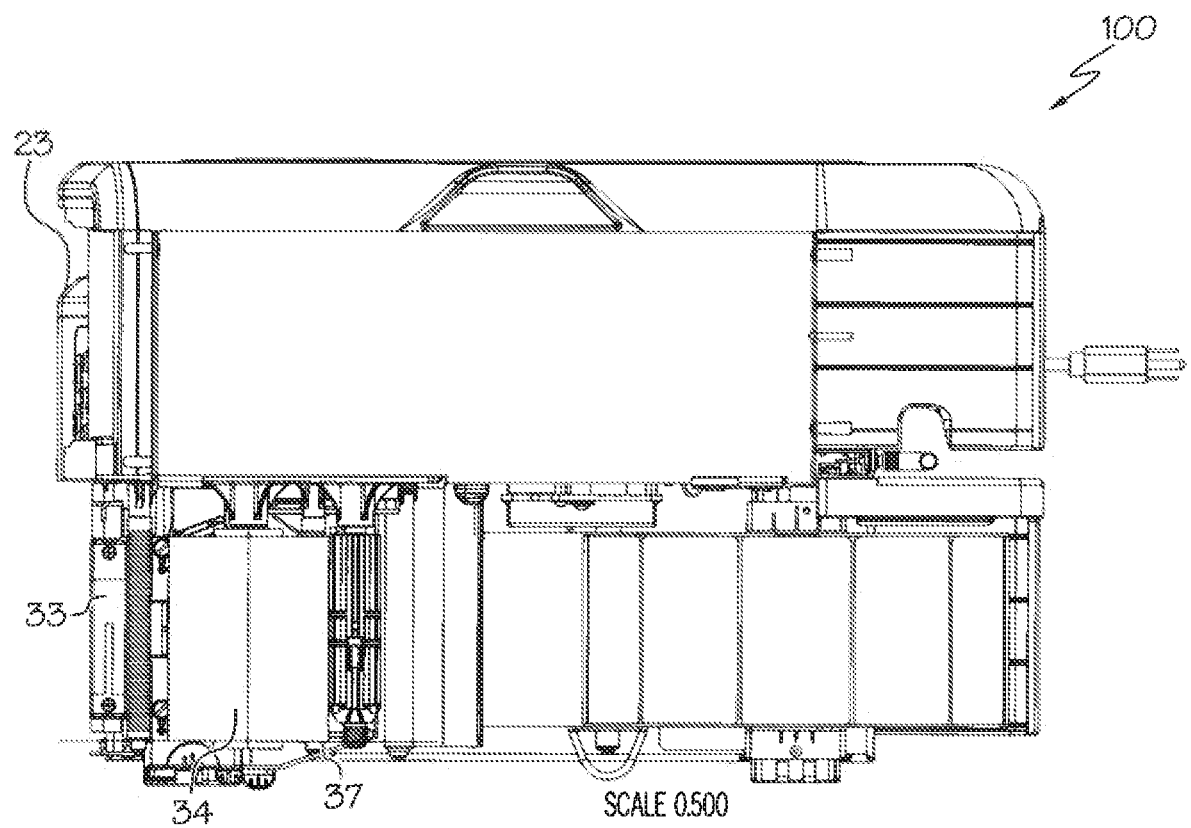
FIG. 7 illustrates a top, perspective view of the thermal tabletop and industrial printer further identifying the I²C NFC inlay, Passive UHF Temperature sensor, an RFID verifier and an RFID encoder in accordance with the disclosed architecture.

Generally referring to FIG. 7, the top, perspective view of the printer 100 discloses the RFID verifier 33 and the RFID encoder 34 (as shown in FIG. 1 as antennas 9 and 13 respectively), as well as UHF Temperature RFID Tag 37. Specifically, the RFID encoder 34 encodes RFID tags while the web is moving, and the RFID verifier 33 verifies the data encoded to the RFID tags. Also disclosed on FIG. 7 is the UHF temperature passive tag used to acquire the operating temperature of the printer.

Specifically, the industrial printer 100 comprises two RFID reader/writers (33 and 34) that are individually controlled, allowing the industrial printer 100 to encode and verify at the same time. Thus, the industrial printer 100 comprises both an RFID writer or encoder 34 module and an RFID verifier 33 module that operate independently encoding and verifying RFID transponders within the label, tag, or other construction media. The two RFID modules cooperate with each other and with the processor of the industrial printer 100. The RFID encoder module 34 encodes the desired information to the RFID transponder when the transponder reaches the encoding location. The RFID verifier module 33 reads the transponders and compares it with information provided by the printer controller. Then, any stock that contains a failed RFID may optionally be marked by the print mechanism, so as to designate it as defective with a visual indication for the user, and the failed verification will be sent to a host for data logging purposes.

Furthermore, typically RFID output power is set to what is necessary to encode the transponder that is electrically singulated in the RF field. There is no other singulation for the transponders therefore it is expected that there is only one transponder present in the RF field at a time. However, the transponder positioned over the antenna may be defective or less sensitive to the set power level such that an adjacent transponder is acquired by the antenna and therefore encoded. Thus, to prevent misreads or other errors such as duplicate tags with the same encoded data, the printer 100 may use adaptive RFID power settings.

Specifically, two power levels are employed to assist in the electrical singulation by software. As reading the contents of a transponder requires less power than encoding it, a sufficiently low power level is used to create an RF field small enough in strength so that the only transponder acted upon is the one positioned immediately over the antenna. At this read power level, the serialized tag identification (TID) field of the RFID transponder would be read and saved. Next, the power level would be increased to the level necessary to write the tag. The TID serial number would be included in the encode command to singulate on the particular tag containing the serial number and ignore any adjacent tags that may accidently be in the RF field. Finally, the RF power level is reduced back down to the selected read level, such that the RFID verifier can read and compare the encoded data of the tag with the data originally sent in the write command to confirm the tag is accurately encoded.

Furthermore, it is known that there is variation within a supply roll from RFID transponder to RFID transponder. The disclosed printer 100 utilizes an adaptive algorithm that will allow for a variation in transponders without generation of an error. This algorithm will start at a read power low enough not to detect a transponder and then will increment up in steps until a transponder is seen. For the next transponder, the previous detection point will be used as a starting point and then will increment up if needed. If more than one transponder is detected the read power will be reduced. If no transponders are detected, then the read power will be increased until a transponder is detected. The selected power will then be used as a starting point for the next transponder and so forth.

Figure 8A:
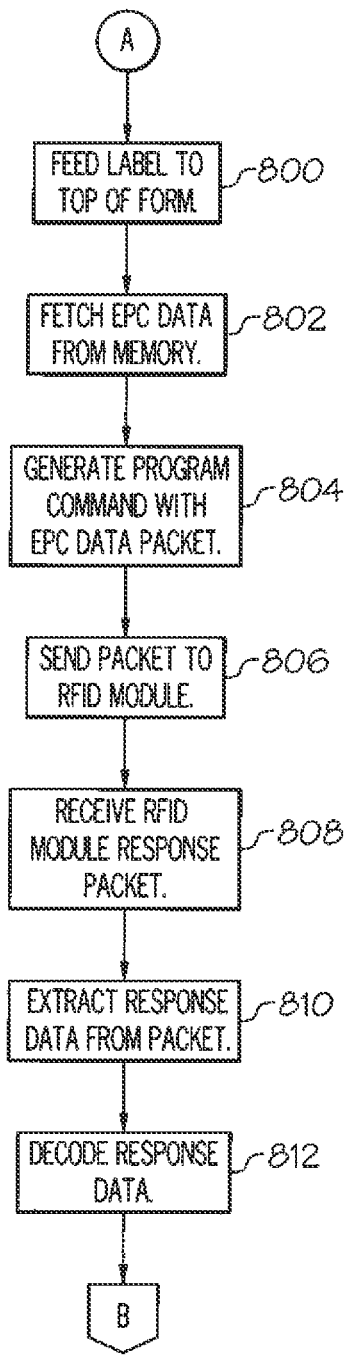
FIGS. 8A and 8B illustrate a flowchart disclosing an RFID read/write operation and a print operation of the thermal tabletop and industrial printer in accordance with the disclosed architecture.
Figure 8B:
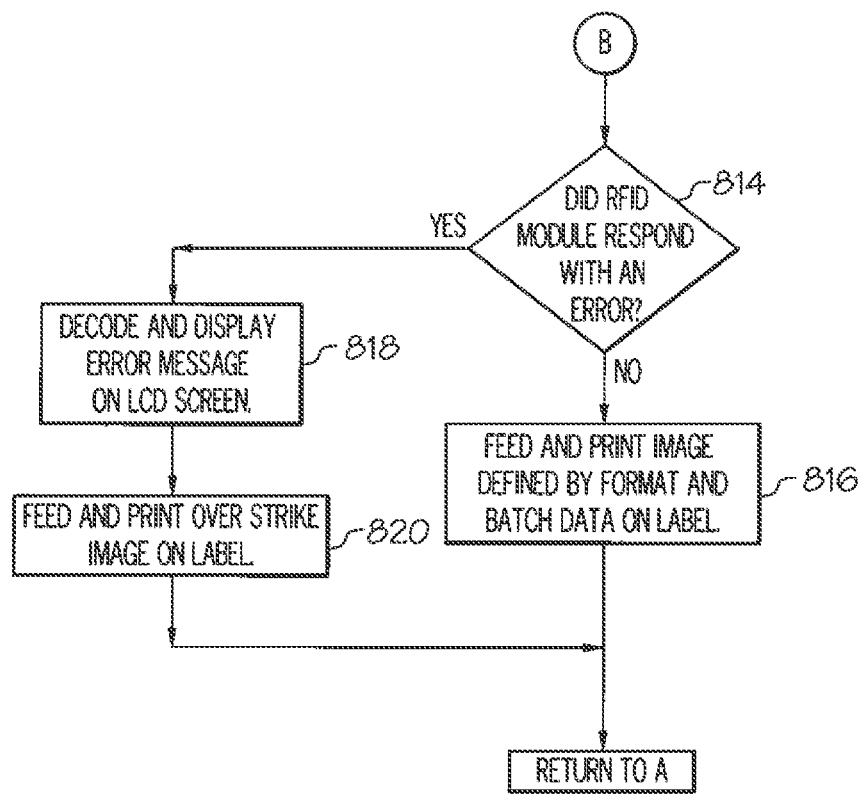

Generally referring to FIGS. 8A-B, the microprocessor controls the printer 100 of the embodiments of the present invention to encode, write to and/or read an RFID transponder in a label and to print on that same label. When the processor decides that the label must be stopped to be encoded at block 800, the processor then controls the printer motor to feed a label into position at which point the movement of the label web is stopped. Once the label is in position, the RFID transponder will be generally aligned with the antenna. At block 802, the microprocessor retrieves data from the memory that has been sent from the host for writing to the RFID transponder. This data may be for example electronic product code (EPC) information or other data. Thereafter, at block 804, the microprocessor generates a program command. The program command is a packet of control information to be sent to the RFID interrogator or module. From block 804, the microprocessor proceeds to block 806 to send the generated packet to the RFID module i.e. interrogator.

It is noted that in a preferred embodiment, the RFID module or interrogator includes its own microprocessor. The RFID module performs a number of functions. For example, the module determines whether an RFID transponder is within its field by reading the RFID transponder's identification code. The RFID module as instructed by the controller erases the data stored in the RFID transponder, verifies the erasure and then programs the RFID data received from the microprocessor into the RFID transponder. The RFID module also verifies that the data has been programmed into the RFID transponder by reading the data stored in the transponder after a programming operation to verify that the data was correctly written into the RFID transponder. Upon completing the verification process, the RFID module generates a response packet that is transmitted back to the microprocessor.

The microprocessor, at block 808, receives the response packet from the RFID module and at block 810, the microprocessor extracts data from the response packet. The data in the response packet may include a code representing the successful programming of the RFID transponder or the data may include a code representing a particular error. For example, the response data may include an error code indicating that the RFID module could not read an RFID tag, or a code indicating that the tag could not be erased or a code indicating that the tag was not accurately programmed. At block 812, the microprocessor decodes the data in the response packet to determine at block 814 whether the programming of the RFID transponder was successful or whether the response packet from the RFID module included an error code. If the programming of the RFID transponder was determined to be successful, that is, without error, at block 814, the microprocessor proceeds to block 816 to control the feeding or movement of the web and the printing of data on the label via the print head. It is noted, that while the RFID transponder is being read from or programmed, the web is stationary. However, during the printing of information on a record member at block 816, the microprocessor moves the web past the print head during the printing operation. If the microprocessor determines at block 814 that the response packet received from the RFID module indicated an error condition, the microprocessor proceeds to block 818 to display an error message on a liquid crystal display of the printer. From block 818, the microprocessor proceeds to block 820 to feed the label with the defective RFID transponder past the print head and controls the print head to print an overstrike image, such as evenly spaced longitudinally extending bars, on the record member RM. This indicates that the RFID transponder is defective. From blocks 816 or 820, the microprocessor proceeds to block 800 to feed the next label into position as discussed above.

Figure 9A:
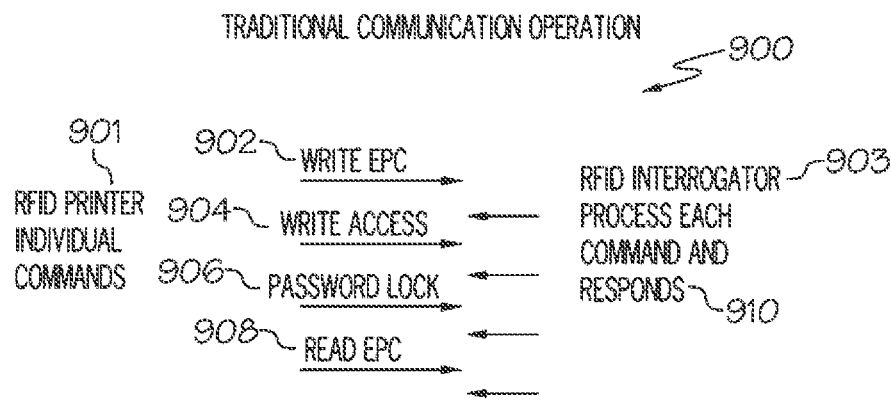
FIG. 9A illustrates a line diagram of a traditional communication operation of an RFID printer in accordance with the disclosed architecture.
Figure 9B:
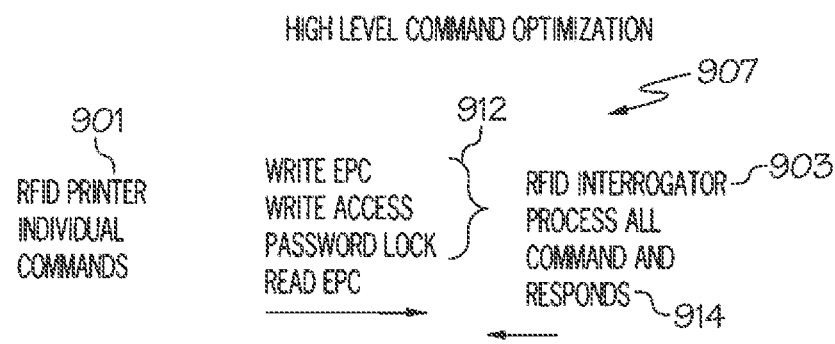
FIG. 9B illustrates a line diagram of a high level command optimization operation of an RFID printer in accordance with the disclosed architecture.

Furthermore, in a preferred embodiment, the thermal printer 100 also provides for optimized RFID encoding by reducing the time required to complete a user defined command sequence. A user sequence may include the following command sequence that will select a tag, write the words (6-15 words) of the EPC memory, write the access password in the reserved memory and set the lock memory to password lock and then read the banks of the EPC memory. In a RFID printer with a RFID writer (interrogator) there are two opportunities for optimization. The RFID printer communicates across a communication channel for example serial, USB or other method to a RFID writer that contains an independent processor. This communication involves a handshake and necessary error processing. If it is already known that a sequence of commands will be sent to the RFID writer, the implementation of a command stack sent in one sequence will eliminate unnecessary overhead between the RFID printer and the RFID writer. Generally referring to FIG. 9A, traditional communication operation 900 would involve the RFID printer 901 issuing individual commands for Write EPC 902, Write Access 904, Password Lock 906, and Read EPC 908, then the RFID interrogator 903 would process each command (902, 904, 906, and 908) and respond 910 after each command creating unnecessary overhead between the RFID printer 901 and the RFID interrogator 903. Generally referring to FIG. 9B, the RFID printer 901 creates a high level command optimization operation 907, wherein the RFID printer 901 issues the individual commands of Write EPC, Write Access, Password Lock, and Read EPC as one command 912, allowing the RFID interrogator 903 to process all the commands 912 at once and then respond 914, saving time and eliminating the unnecessary overhead between the RFID printer 901 and the RFID interrogator 903.

In addition, between the RFID writer and the RFID tag there is a handshake that can be optimized if there is pre-knowledge that a set of high level commands will be sent. The handshake process can be optimized if there is no reason to power down the RFID tag. However, one reason the RFID tag may need to be powered down is to change the power level to a different power. For instance, if the RFID tag EPC memory was written at one power and the RFID tag EPC memory was read at a different power, then a power down is necessary.

Furthermore, EPC RFID access commands must follow an inventory to obtain the tag handle REQ_RN. For each access (Read, Write, Kill, Lock) command that is done this sequence must be followed. For a thermal barcode printer with an RFID writer this sequence contains redundant steps if more than one access command is executed after the tag has been acquired since the REQ_RN handle must be reacquired for the same tag for each access command. The EPC Gen 2 protocol specifies that as long as the tag is powered on it must retain the REQ_RN handle. Thus, in order to optimize the command sequence, the select and inventory commands issued for each access command have been optimized out as long as the tag is powered on.

Figure 10A:
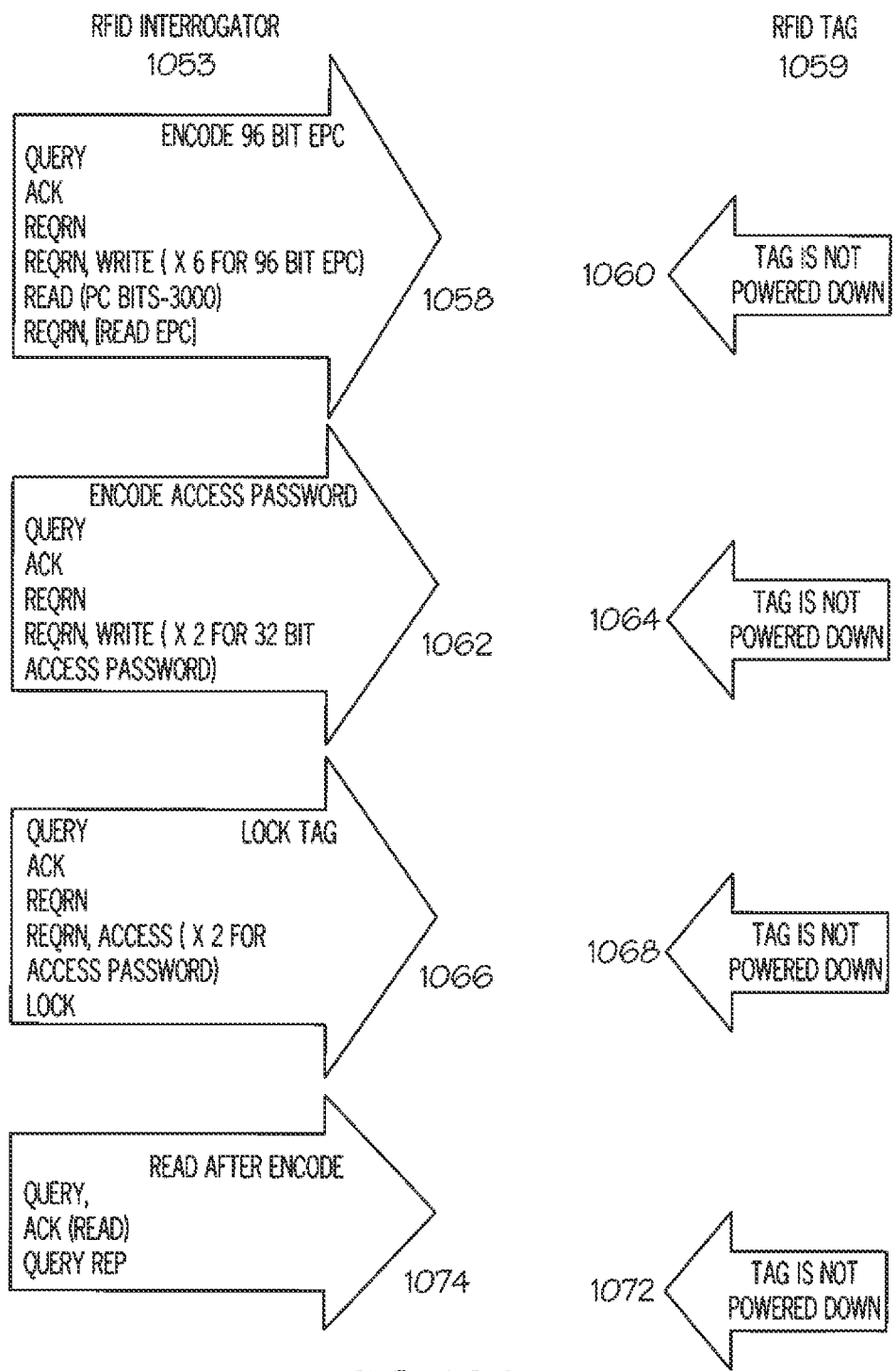
FIG. 10A illustrates a communication process without foreknowledge of a communication sequence of an RFID interrogator in accordance with the disclosed architecture.
Figure 10B:
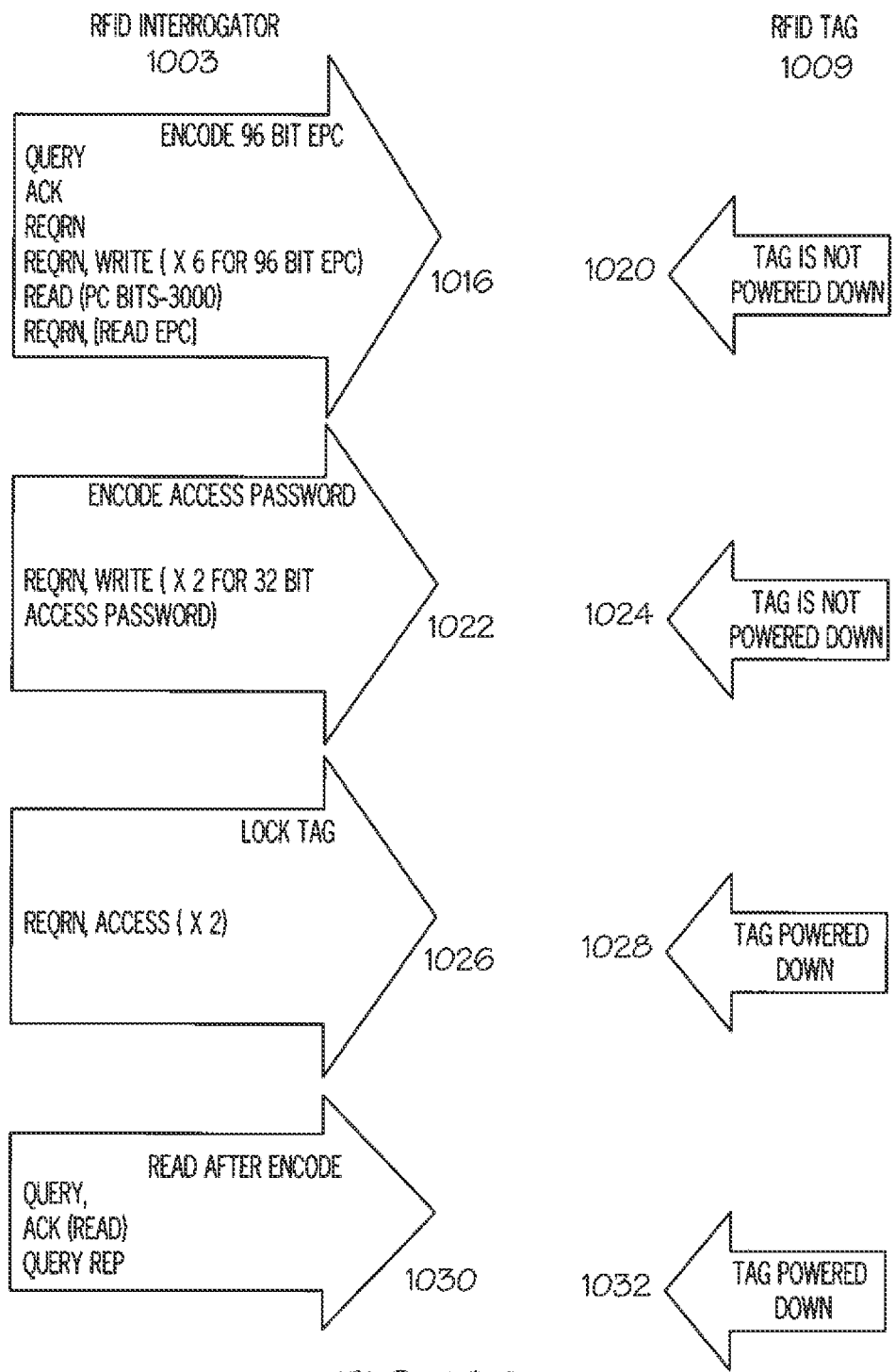
FIG. 10B illustrates a communication process with foreknowledge of a communication sequence of an RFID interrogator in accordance with the disclosed architecture.

Generally referring to FIG. 10A, the traditional communication process of a high level command sequence, for illustrative purposes the following commands: Write EPC, Write Access Code, Lock Tag, ReadEPC; without foreknowledge of communication requires the RFID Interrogator 1053 for to issue the command sequence for encoding the 96 bit EPC, a query command 1058 and the RFID tag 1059 will respond RN_16, 1060, then the RFID Interrogator 1053 issues Ack (RN16) 1058 and the RFID tag 1059 responds with PC, EPC & CRC-16 1060 to identify the command stream. Then the RFID Interrogator 1053 issues REQ_RN 1058 and the RFID tag 1059 issues the handle (New RN16) 1060, then the RFID Interrogator 1053 issues the Write Command 1058 and the RFID tag 1059 responds with the Status—Success, Error Failure 1060. At this point the RFID Interrogator 1053 issues Read PC bits and ReqRN 1058 to which tag 1059 responds with the EPC. Since the RFID Interrogator had not preprocessed the command sequence in Encode Access Password the chip must be powered on and transitioned to the Open state. 1062. RFID Interrogator 1053 reissues the Query, ACK, ReqRN, ReqRN before writing the Access Password in 1062. The tag 1059 will respond appropriately in 1064 to these commands. Next the RFID Interrogator 1053 will issue the command sequence required to lock the tag 1059. Since the tag 1059 was not kept in the open state the RFID Interrogator 1053 will need to reissue Query, ACK, ReqRN 1066, ReqRN before locking tag 1059. Tag 1059 will respond appropriately 1068. A final read is shown in 1074 that could be used for validation purposes to ensure accuracy. The tag 1059 is starting from power on the Query, ACK and Query Rep need to be issued from RFID Interrogator 1053 to which tag 1059 responds in 1072. However, if the RFID Interrogator 1053 already has knowledge of a command stream as illustrated in FIG. 1013 then the select and query commands become redundant, and the interrogator 1053 and the chip (or tag 1059) only need to issue the Req-RN 1020 before receiving the next access command 1022. Thus, as illustrated in FIG. 1013, the communication process with foreknowledge of the communication sequence discloses the RFID Interrogator 1059 issuing the next access commands 1016 and 1022 to encode the Access Password the Query and ACK are eliminated to increase the encoding throughput. Req_RN command at 1022 followed by the 32-bit write to the access password. RFID tag 1009 at 1024 issuing the handle (New RN 16) 1024 and the RFID Interrogator 1003 responding with the Access Command 1026 and the RFID tag 1009 responding with the Status Success, Error Failure 1028. This process is continued to be followed in 1026 for the lock command. In 1028 the tag 1009 responds appropriately. If it is desired to do a final read to ensure encoding accuracy if the read is at the same power the process between 1003 and 1009 is shown streamlined in 1030 and 1032. Thus, with knowledge of a command stream, the communication sequence between the interrogator 1003 and the chip (or tag 1009) can be optimized via removal of the query and Ack commands between the access commands. This optimization reduces the overall cycle time. Further, a composite RFID Interrogator Host Write memory command which provides for successive writes to various memory blocks in a RFID Gen 2 Tag device before returning the results of the command to the host can be utilized to optimize system throughput. This command accepts memory block identification for each memory block to be written and data to be written into each memory block. The RFID Interrogator executes the necessary Gen 2 RFID tag device commands to place the tag into the Open State and then proceeds to execute to Gen 2 the successive Write commands to the various memory blocks, defined in the host command.

When all memory blocks have been written, the RFID Interrogator returns the tag device to the ready state and returns the status of the results to the host.

Furthermore, optimization of the thermal printer occurs with successive write and verify commands. Specifically, a composite RFID interrogator host write/verify command which provides for multiple writes to various memory areas in an RFID Gen 2 tag device where the tag device is left in the Open state for the duration of the entire set of command write/verification operations is utilized. The command is executed in two stages. In the first stage, the command is defined as a record with a unique ID, followed by a flag that specifies whether an optional tag identification (TID) is to be used for identifying the tag to be written to. This is followed by one or more write directives, where each directive is comprised of the memory bank to write to, the word offset into the memory bank to begin writing, the number of words to write, and a flag that indicates whether the write is to be verified.

In the second stage, the data to be encoded for each tag is sent as a record beginning with a unique ID that matches the ID defined in the first stage, followed by an optional TID used to identify the tag in the RF field, followed by one or more write directives that match the write directives defined in stage 1. In this record each write directive contains the actual data to be written to the memory areas specified in stage 1. After writing, the specified memory banks optional verification read could occur in the same state where allowed by the chip architecture. Upon completion of the write and verification phases the Interrogator powers the tag device down and returns the results of the command to the host.

Thus, this composite RFID Interrogator Host Write memory command would be used in the RFID enabled thermal barcode printer 100 reducing the amount of time required to complete a user defined command sequence increasing the overall throughput of the RFID encode sequence which would allow a user to increase the throughput and encode at higher web speeds. As a result, more RFID tags per minute can be produced thus increasing printer productivity. This higher productivity would increase printing capacity to meet demand.

Generally referring to FIGS. 1-7, an exemplary embodiment of a system which may include at least a printer 100 and encoder/verifier is shown. Printer 100 can print through ink jet, flexographic, offset, gravure, digital offset or xerographic digital processes, or any other desired print process. Printer 100 can accept input information in any format, for example Portable Document Format (PDF), Personalized Print Markup Language (PPML), Java Script Object Notation (JSON) or any other desired format. The information is typically provided from a computer which may either be co-located with the printer 100 or may be provided in a remote location. The printer 100 may be connected to the computer via an intranet or over the Internet, depending on the requirements of the manufacturing operation. Printer 100 can also include one or more RFID readers and RFID encoders 34 (as shown in FIGS. 1-7, such as for example FIG. 7) which can be arranged in any configuration, for example in a configuration that allows RFID encoding to occur in line, either before or after printing.

In exemplary embodiments, printer 100 can contain multiple RFID readers and RFID encoders 34, arranged in such a way that allows multiple products, for example in sheet or roll form, to be printed and encoded as part of a continuous process. It should be understood that the reader and encoder can be combined in a single unit or provided in a two separate components. Printer 100 can also comprise an RFID verifier 33 that verifies the data encoded by the RFID encoder 34. The RFID encoder 34 and RFID verifier 33 are individually controlled such that encoding and verifying can occur at the same time. Printer 100 can also isolate adjacent products from radio-frequency cross-coupling and interference using physical screening, for example with a moving shutter, electrical screening, for example using infrared light or an interfering carrier signal, or by any other desired method for providing electrical shielding.

Still referring to FIGS. 1-7, printer 100 can also have a quality control system (not shown), such as a vision inspection system, RFID test system or other device to ensure adequate quality in the unit. Quality control system can be located in line with the printer 100, or it can be located off line, such as with a remote RFID test station. Quality control system can include one or more RFID readers and RFID encoders 34, which can allow quality control system to check products for errors in RFID encoding. Quality control system can also include optical readers or scanners in any desired configuration, which can allow quality control system to check products for errors in printing. Quality control system can further include a die cutter, which can allow the system to separate improper or defective products so that they can be discarded or reprocessed. RFID products that are detected as being defective can be marked or otherwise identified so that they can be removed from the web or sheet during manufacturing or inspection or can be easily recognized by the customer so that the end user does not use the defective tag as part of RFID tag or label.

Referring generally to the FIG., printer/encoder 100 can encode RFID devices using full encoding or it can encode RFID devices or products using partial encoding with the remainder of the coding to be completed by the end user such as a retail or brand owner. When using full encoding, printer/encoder 100 may fully program each RFID device or product individually. This programming can occur all at once (e.g. substantially simultaneously) or in stages, in an incremental fashion or as desired. When using partial encoding, printer/encoder 100 can program each RFID device or product with only a portion of the information that is to be stored on the products. This programming can occur all at once or in stages, as desired. For example, when using EPCs and partial encoding, printer/encoder 100 can receive a sheet of RFID products that have already been programmed with the portion of the EPCs that are common to all RFID products in the sheet, batch of sheets or roll. This can allow printer/encoder 100 to save time by only encoding each RFID device or product with variable information that is different for each product in the sheet or roll. In some embodiments, fixed data fields can be encoded and the unique chip identification number can be used as the serialization.

In another embodiment, the printer 100 includes a microprocessor and a memory (not shown). The memory includes non-volatile memory such as flash memory and/or a ROM such as the EEPROM. The memory also includes a RAM for storing and manipulating data. In accordance with a preferred embodiment of the present invention, the microprocessor controls the operations of the printer 100 in accordance with an application program that is stored in the flash memory. The microprocessor may operate directly in accordance with the application program. Alternatively, the microprocessor can operate indirectly in accordance with the application program as interpreted by an interpreter program stored in the memory or another area of the flash memory.

The microprocessor is operable to select an input device to receive data therefrom and to manipulate the receive data and/or combine it with data received from a different input source in accordance with a stored application program. The microprocessor couples the selected, combined and/or manipulated data to the printing system for printing on a record member. The microprocessor may select the same or different data to be written to an external RFID chip. The microprocessor couples the data selected for writing to the RFID read/write module wherein the data is written in encoded form to the external RFID chip. Similarly, the microprocessor can select the same or different data for storage in a transaction record in the RAM and for uploading via the communication interface to a host. The processor is operable to select data to be coupled to the printing system independently of the data that the processor selects to be coupled to the RFID read/write module to provide greater flexibility than has heretofore been possible.

Figure 12A:
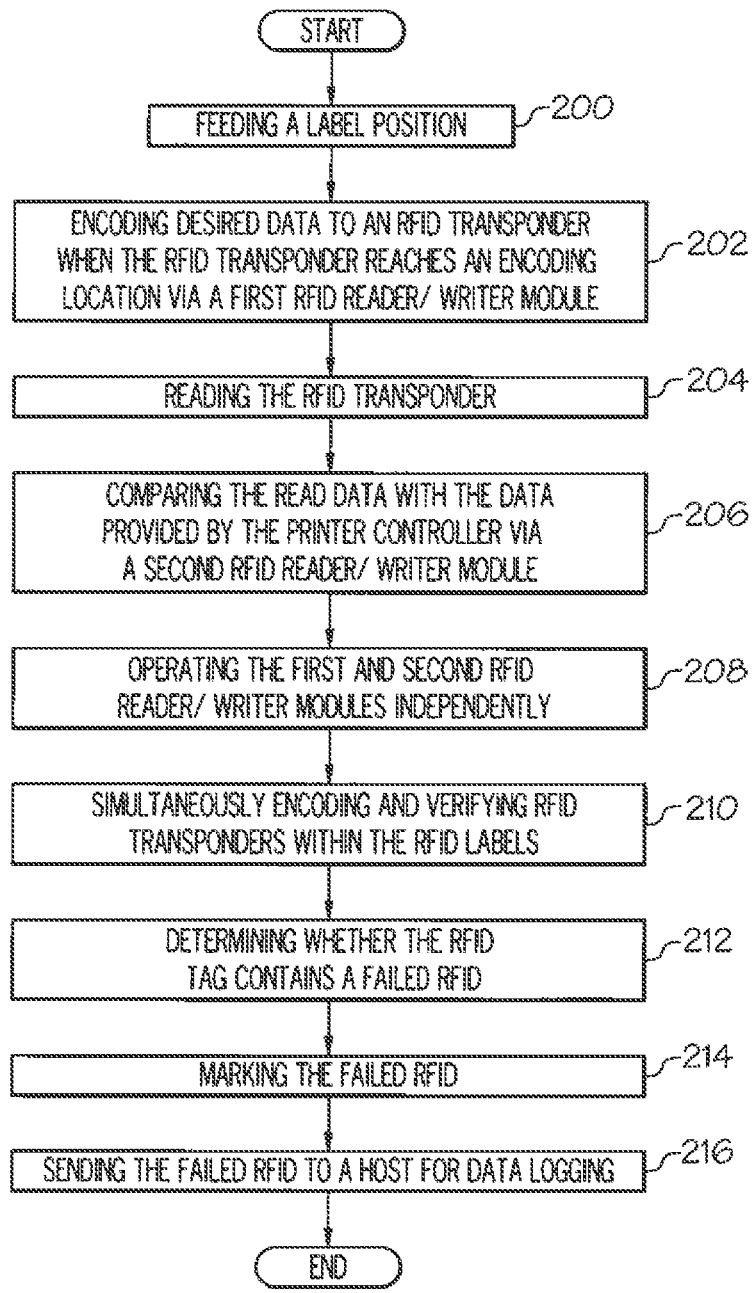
FIG. 12A illustrates a flowchart disclosing an RFID read/write and verify operation of the thermal tabletop and industrial printer in accordance with the disclosed architecture.
Figure 18:
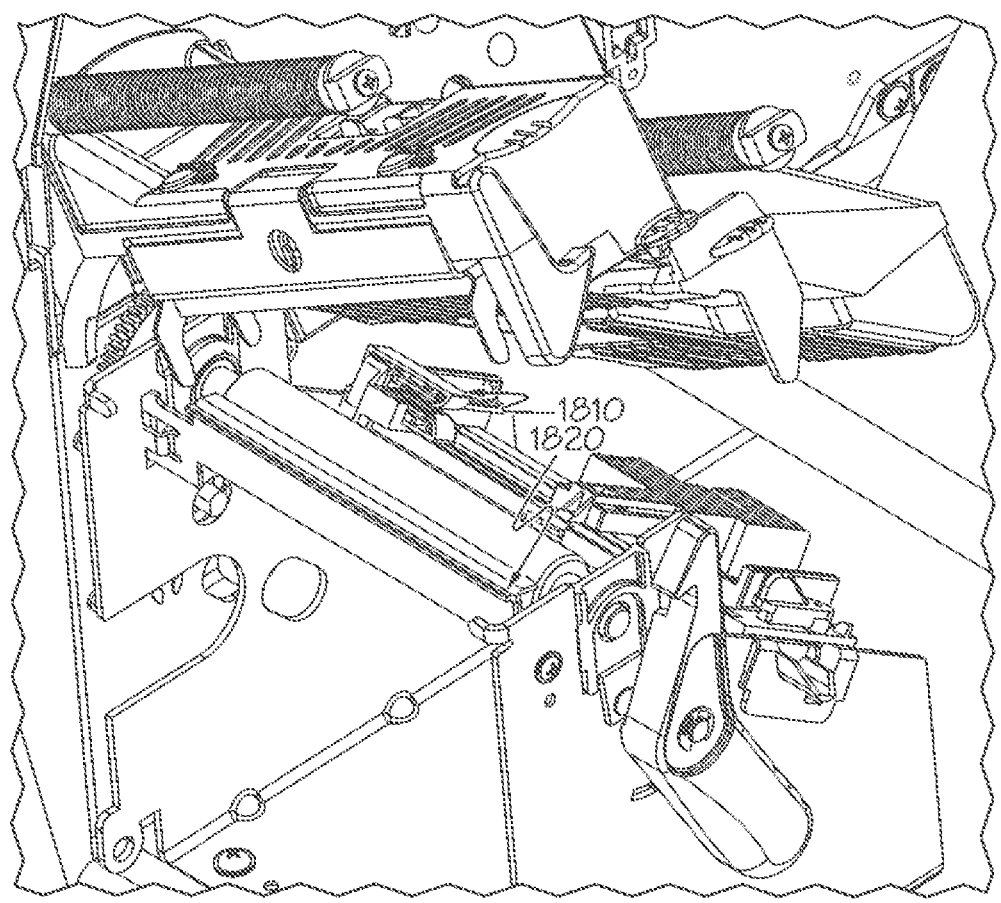
FIG. 18 illustrates a cut away of the thermal tabletop and industrial printer comprising a sensor array in accordance with the disclosed architecture.

Generally referring to FIG. 12A, the industrial printer 100 comprises two RFID reader/writers (33 and 34) that are individually controlled, allowing the industrial printer 100 to encode and verify at the same time. Thus, the industrial printer 100 comprises both an RFID writer or encoder 34 module and an RFID verifier 33 module that operate independently encoding and verifying RFID transponders within the label, tag, or other construction media. The two RFID modules cooperate with each other and with the processor of the industrial printer 100. At 200, a label is fed into position, and then at 202 the RFID encoder module 34 encodes the desired information to the RFID transponder when the transponder reaches the encoding location. At 204, the RFID verifier module 33 reads the transponders and at 206 compares it with information provided by the printer controller. Thus, the two RFID reader/writers (33 and 34) are operated independently (see 208), allowing the industrial printer 100 to simultaneously encode and verify the RFID transponders within the RFID labels (see 210). At 212, it is determined whether the RFID tag contains a failed RFID. Then, at 214 any stock that contains a failed RFID may optionally be marked by the print mechanism, so as to designate it as defective with a visual indication for the user, and the failed verification will be sent to a host for data logging purposes (see 216). It may be advantageous to place a shield between the two RFID reader/writers 33 and 34 as shown in 1820 FIG. 18 to minimize the cross talk between the two RFID reader/writers 33 and 34.

Furthermore, typically RFID output power is set to what is necessary to encode the transponder that is electrically singulated in the RF field. There is no other singulation for the transponders therefore it is expected that there is only one transponder present in the RF field at a time. However, the transponder positioned over the antenna may be defective or less sensitive to the set power level such that an adjacent transponder is acquired by the antenna and therefore encoded. Thus, to prevent misreads or other errors such as duplicate tags with the same encoded data, the printer 100 utilizes adaptive RFID power settings.

Specifically, two power levels are employed to assist in the electrical singulation by software. As reading the contents of a transponder requires less power than encoding it, a sufficiently low power level is used to create an RF field small enough in strength so that the only transponder acted upon is the one positioned immediately over the antenna. At this write adjust power level, the serialized tag identification (TID) field of the RFID transponder would be read and saved. Next, the power level would be increased to the level necessary to write the tag. The TID serial number would be included in the encode command to singulate on the particular tag containing the serial number and ignore any adjacent tags that may accidently be in the RF field. Finally, the RF power level is reduced back down to the selected write adjust level, such that the RFID verifier can read and compare the encoded data of the tag with the data originally sent in the write command to confirm the tag is accurately encoded.

Furthermore, it is known that there is variation within a supply roll from RFID transponder to RFID transponder. The disclosed printer 100 utilizes an adaptive algorithm that will allow for a variation in transponders without generation of an error. This algorithm will start at a write adjust low enough not to detect a transponder and then will increment up in steps until a transponder is seen. For the next transponder, the previous detection point will be used as a starting point and then will increment up if needed. If more than one transponder is detected the write adjust owner will be reduced. If no transponders are detected, then the write adjust power will be increased until a transponder is detected. The selected power will then be used as a starting point for the next transponder and so forth. If this is not sufficient to uniquely identify the transponder the singulation process will be enhanced as follows.

Figure 12B:
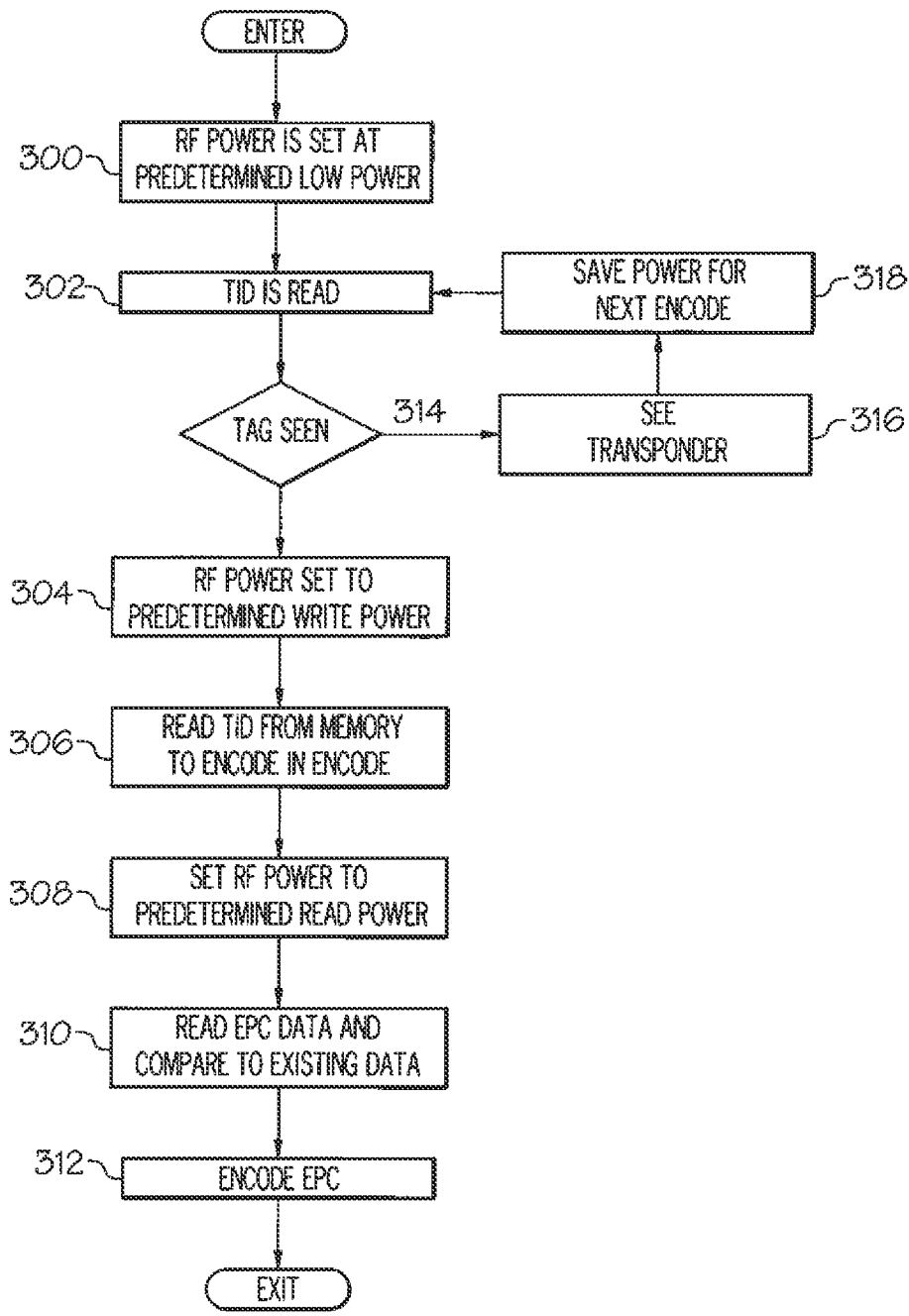
FIG. 12B illustrates a flowchart disclosing adaptive RFID power settings for the thermal tabletop and industrial printer in accordance with the disclosed architecture.

Generally referring to FIG. 12B, two power levels are employed to assist in the electrical singulation by software. As reading the contents of a transponder requires less power than encoding it, a sufficiently low power level is used to create an RF field small enough in strength so that the only transponder acted upon is the one positioned immediately over the antenna (see FIG. 12b, 300). At this writer adjust power level, the serialized tag identification (TID) field of the RFID transponder would be read and saved (see 302). At 304, the power level is increased to the level necessary to write the tag. At 306, the TID serial number would be included in the encode command (see 312) to singulate on the particular tag containing the serial number and ignore any adjacent tags that may accidently be in the RF field. At 308, the RF power level is reduced back down to the selected read level, and at 310 the RFID verifier can read and compare the encoded data of the tag with the data originally sent in the write command to confirm the tag is accurately encoded.

Furthermore, it is known that there is variation within a supply roll from RFID transponder to RFID transponder. The disclosed printer utilizes an adaptive algorithm that will allow for a variation in transponders without generation of an error. At 314, this algorithm will start at a writer adjust power low enough not to detect a transponder and then at 316 will increment up in steps until a transponder is seen. For the next transponder, the previous detection point will be used as a starting point and then will increment up if needed (see 318). If more than one transponder is detected the writer adjust power will be reduced. If no transponders are detected, then the writer adjust power will be increased until a transponder is detected. The selected power will then be used as a starting point for the next transponder and so forth.

Figure 13:
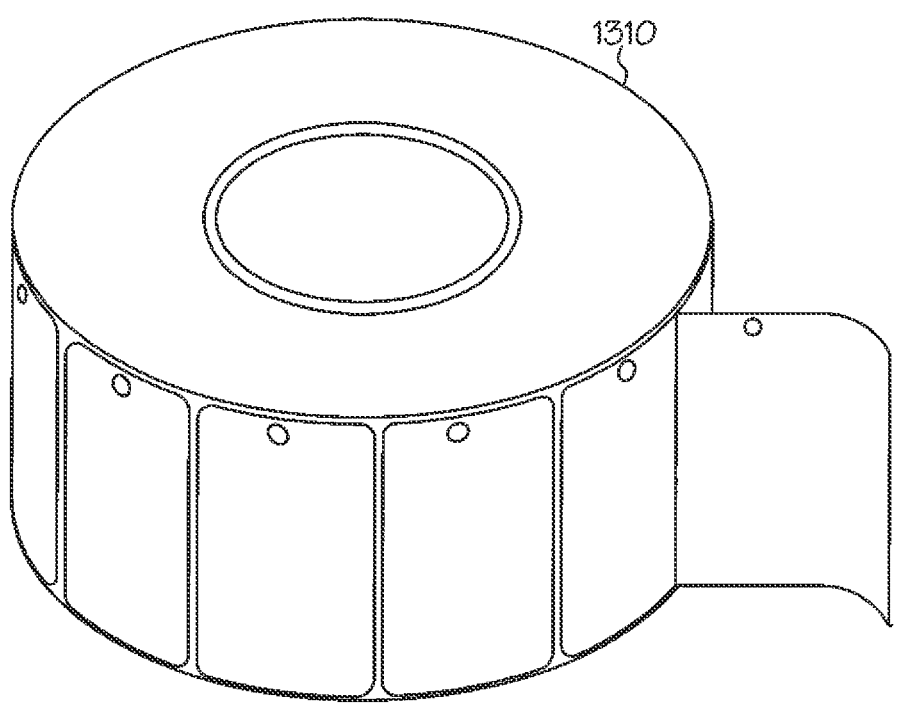
FIG. 13 illustrates a roll of tag supplies aperture mark holes for use with the thermal tabletop and industrial printer in accordance with the disclosed.
Figure 14:
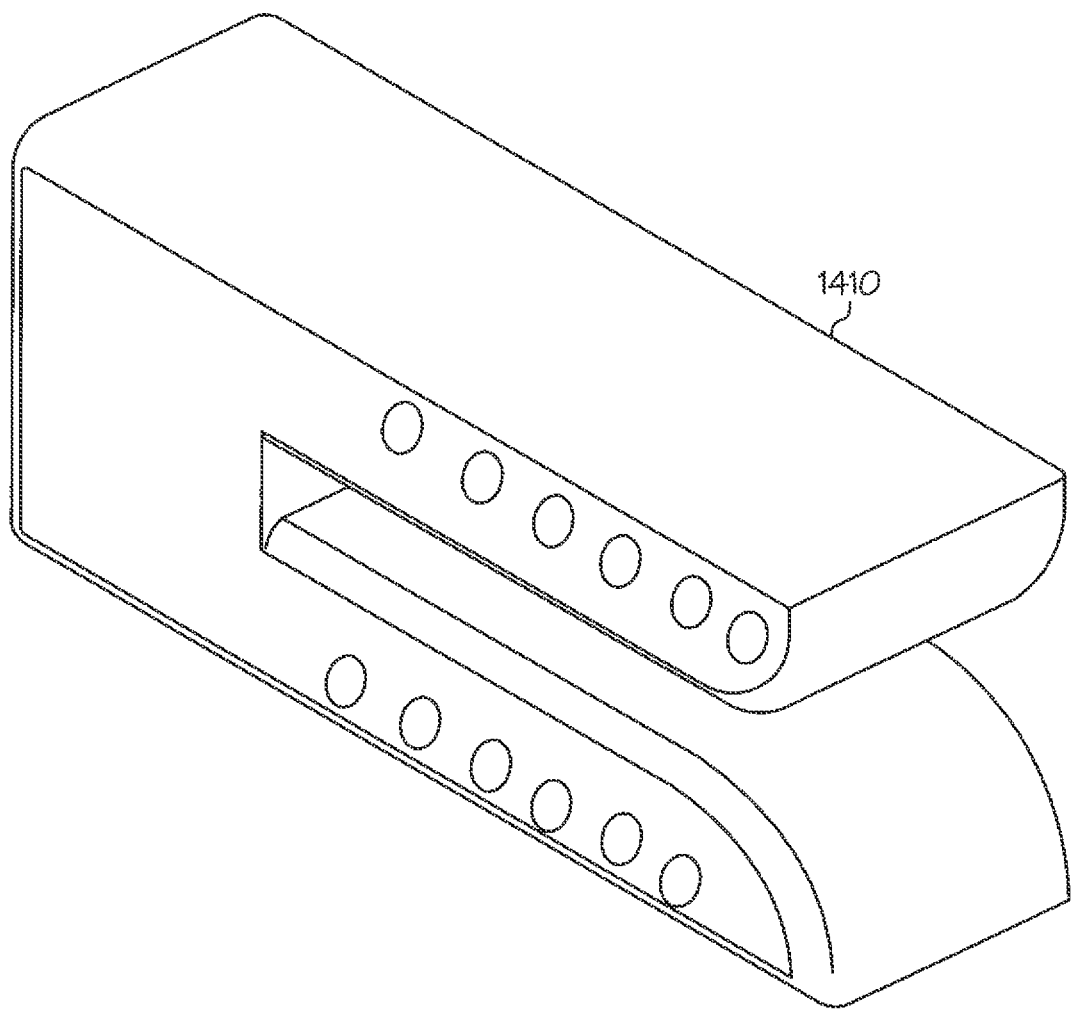
FIG. 14 illustrates an array sensor of the thermal tabletop and industrial printer in accordance with the disclosed architecture.

In FIG. 13, 1310, shows a representation of a web of tag supply with aperture holes. Reference numeral 1540 (see FIG. 15) indicates one embodiment of the aperture on the tag located on roll 1310 that be pushed past sensor 1410 (see FIG. 14) retained in supply guide 8. In one embodiment the aperture hole enables light to pass from the emitter to the detector as it moves by the sensor array indicated by 1810 on FIG. 18 which obtains the reference voltage by using the controller logic retained on CPU board 29. The aperture or break in the supply 1310 will normally exceed the focal point of one of the sensors 1410. The aperture or break in supply 1310 can be aligned anywhere along sensor 1410.

Figure 15:
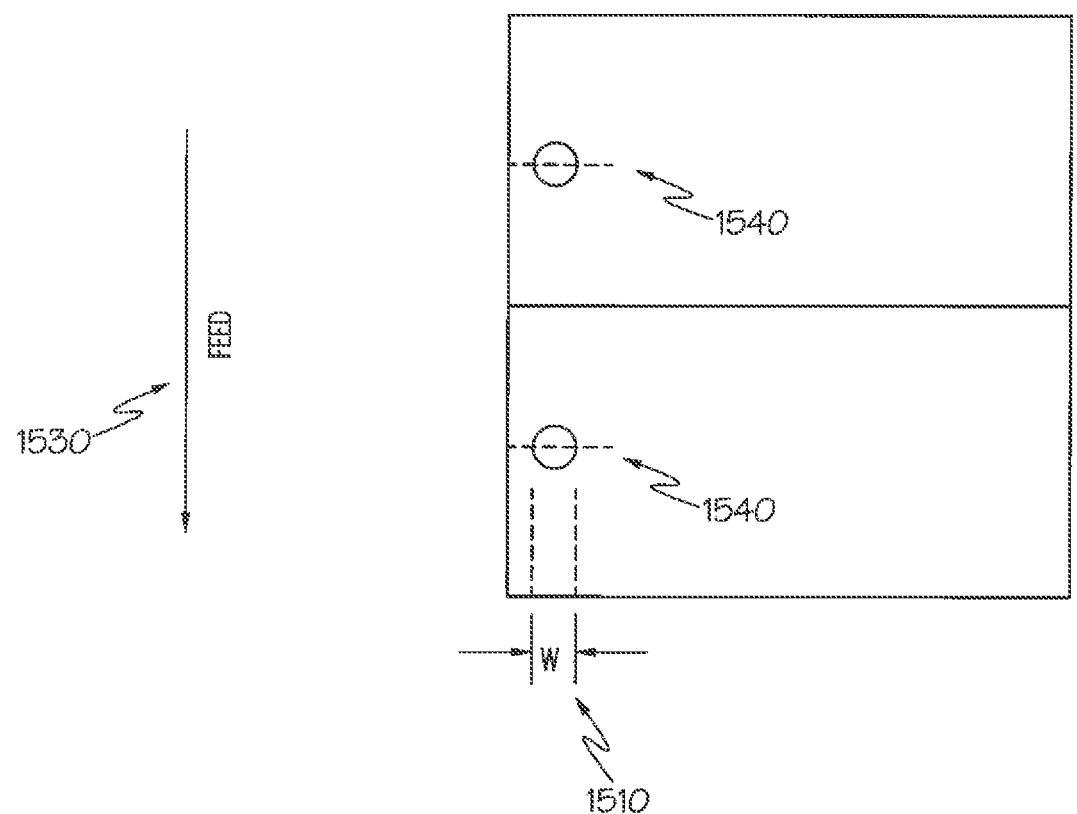
FIG. 15 illustrates a close up view of a tag from the roll of tag supplies in accordance with the disclosed architecture.
Figure 16:
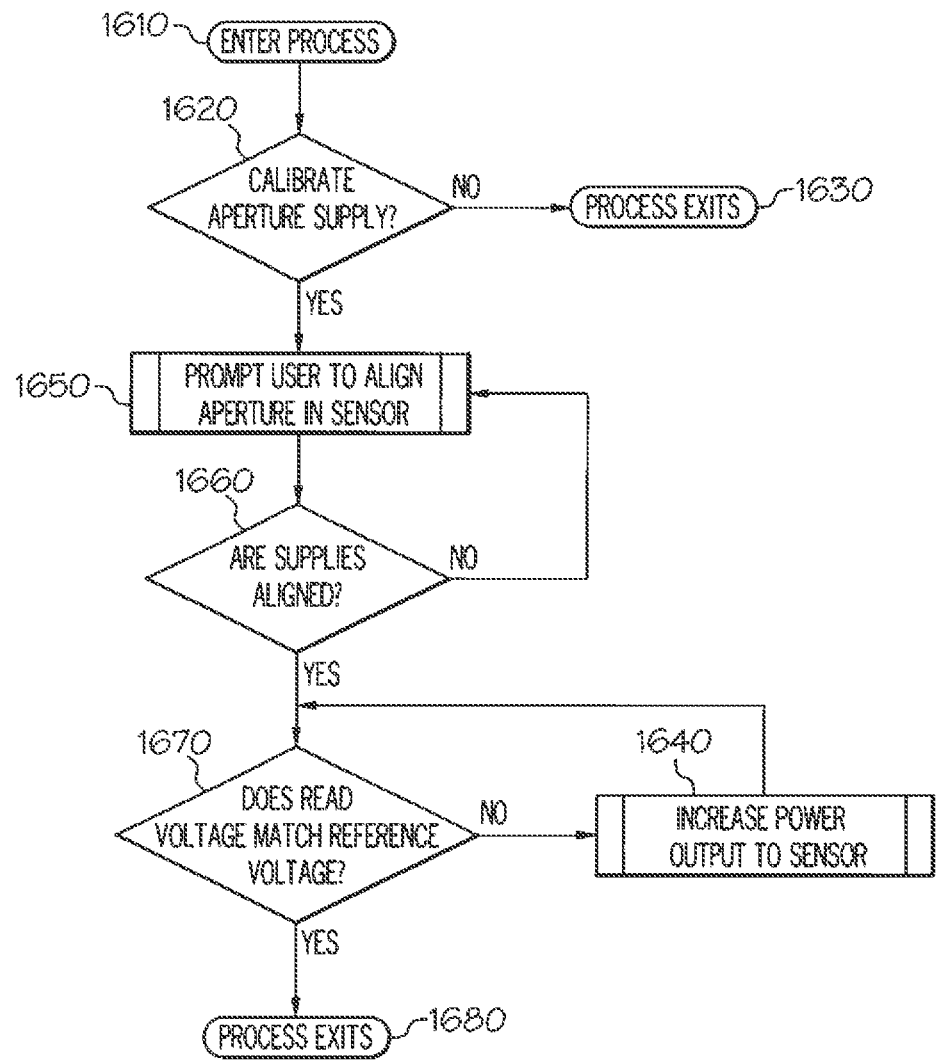
FIG. 16 illustrates a flow chart of calibration in accordance with the disclosed architecture.

Prior to running supplies 1310 through printer 100 it would be expected that the calibration processes initiated in process 1610 depicted on FIG. 16 would be completed. The flow of calibration is to prompt the user if they would like to calibrate aperture supply, 1620, if not the process exits in 1630. If the user wishes to continue and the aperture supply is calibrated, the user is prompted to align the aperture in sensor 1410 installed in printer 100 for the calibration process. The diameter of the aperture shown by reference numeral 1510 in FIG. 15 must be placed in sensor 1410 prior to moving to decision point 1660. The user is prompted verify that the supplies are properly aligned in 1660 prior to moving the 1670 to acquire the actual voltage. The read voltage is compared to the desired reference voltage if the read voltage in 1670 meets or exceeds the reference voltage the process is completes and exits in 1680. If the read voltage is less than the reference voltage the power is increased to the sensor in 1640 and the read voltage is acquired again.

Figure 17:
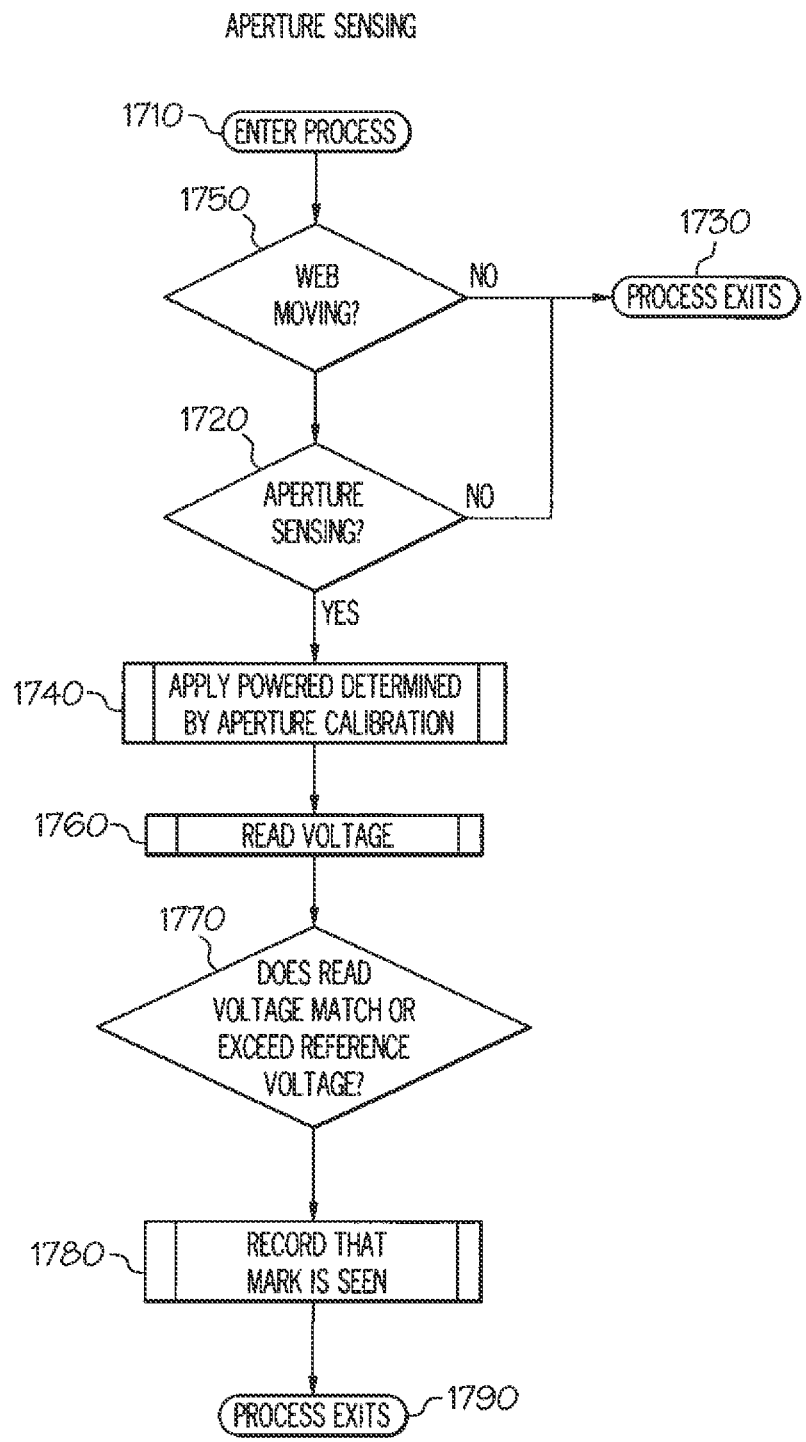
FIG. 17 illustrates a flow chart of tag sensing in accordance with the disclosed architecture.

When printer 100 prepares to move web 1310 showing a feed direction in 1530 in FIG. 15, the selected media sensor enters the process of checking which sensor is being used, 1710 on FIG. 17. Prior to testing the sensors there is a test to determine if the web is moving in 1750. If there is no movement the process exits in 1730. If the aperture sensor is selected 1720 the process continues to 1740 or else the process exits in 1730. In 1740 the voltage determined in 1670 is applied to sensor 1410. The voltage is acquired from sensor 1410 in 1760. A test is completed in 1770 to determine if the reference voltage matches or exceeds the reference voltage. If not the process returns to 1720. If the reference voltage does exceed reference voltage in 1780 it is recorded that a mark is seen and the process terminates in 1790. This process represents one example of control logic for sensor 1410. In other examples is presumed that hysteresis would be added to the control logic depicted in FIG. 17 to prevent false readings of a mark.

Figure 19:
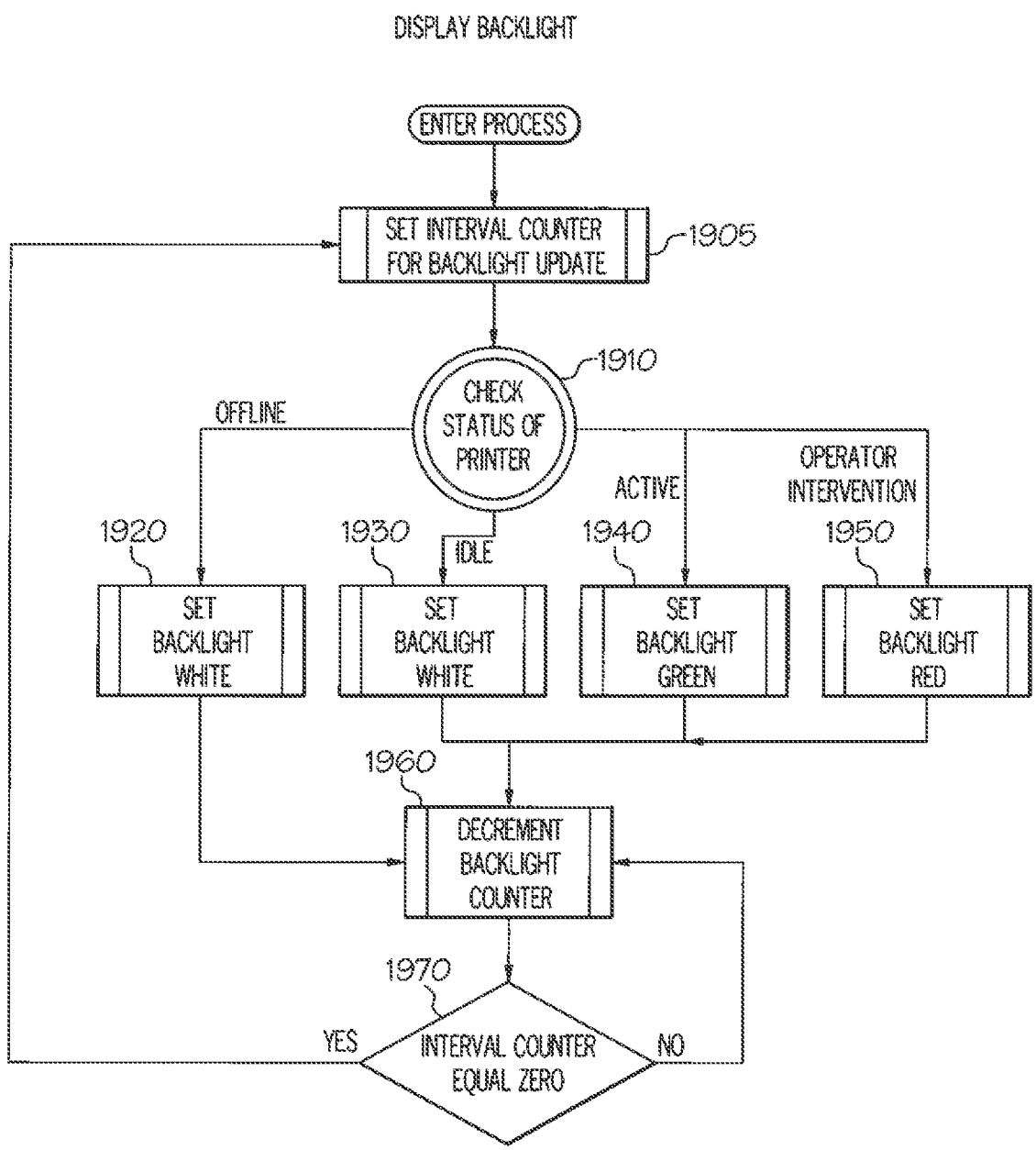
FIG. 19 illustrates a flow chart for setting backlight for a display of the thermal tabletop and industrial printer in accordance with the disclosed architecture.

In FIG. 19, 1910 shows checking the status of the printer in order to set the backlight for the display shown in 25 on printer 100. When the status of the printer is determined one of four paths are followed: 1920 is if the status of the printer is idle a backlight will be set to white. In 1930 if the status of the printer is offline the backlight is set to white. In 1940 if the status of the printer is active the backlight is set to green. In 1950 if the status of the printer is an operator intervention required the backlight is set to read. Finally, the process enters the sub process 1960 to count down the system flag status check. If 1970 when the count reaches zero, we reenter 1905 to reset the interval counter and then check the current status of the industrial printer in 1910.

Figure 20A:
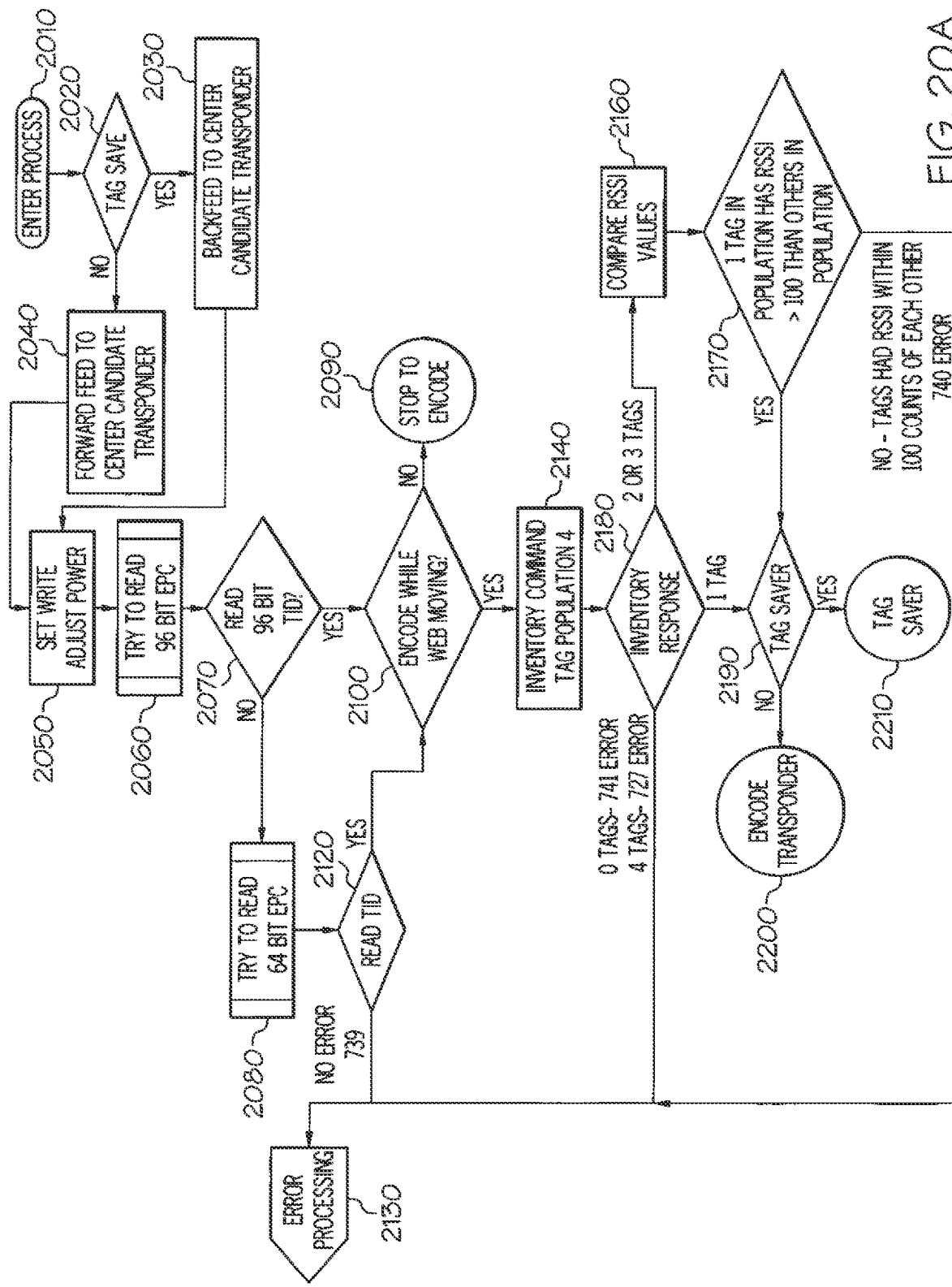
FIG. 20A-20E outlines a process flow of RSSI improved singulation in accordance with the disclosed architecture.

RSSI singulation process begins with 2010 in FIG. 20A. Printer 100 either back feeds or forward feeds in order to center the metal of the first candidate inlay over the centerline of the coupler depending on the value of tag save as indicated by 2020. The amount of distance to overfeed, 2040, or back feed, 2030, as determined by the user in identifying the ideal couple point which will be referred to as first TID position.

In step 2050 the power is set to a write adjust power and (in 2060) attempt to read a 96-bit TID. In 2070 it is determined if we successfully read a 96 bit tag is successfully read. If yes, the method continues on to 2100, where the web can be encoded while moving; if the web is not encoded while moving, in step 2090 the process stops encoding. If the web is encoded while moving the inventory command tag population is taken at step 2140. If we fail to read a 96 bit transponder at 2070, the process continues to step 2080. On step 2 2080 the system attempts to read a 64 bit transponder in 2120. If we fail, we will record the error as 739 and go to 2130. If successful, else we go to step 2100. In 2100 we determine if we are encoding while the web is moving. If this is a stop to encode case we go to 2190.

In the case of encoding while the web is moving we will do a tag inventory with the tag population set to 4. If from the tag inventory we receive 0 tags, we will record error 741 and go to error processing 2130. If we find 4 or more transponders, we will record error 727 and go to error processing 2130. If there is only one transponder we will determine if we are going to move forward or reverse in step 2190. If there are 2 or 3 tags the RSSI values will be compared in step 2160. If there is not a transponder with a count return signal strength indicator of 100 or more at 2170, we will record error 740 and proceed to error processing 2130. If there is a candidate transponder indicated by the RSSI we will processed to step 2190 to determine motion direction.

In step 2190 depending on the user selection of the Tag Saver value we determine the motion. If the value is yes, we processed to the tag saver function in 2210 if the value is no we processed to encoding the transponder in 2200.

Figure 20B:
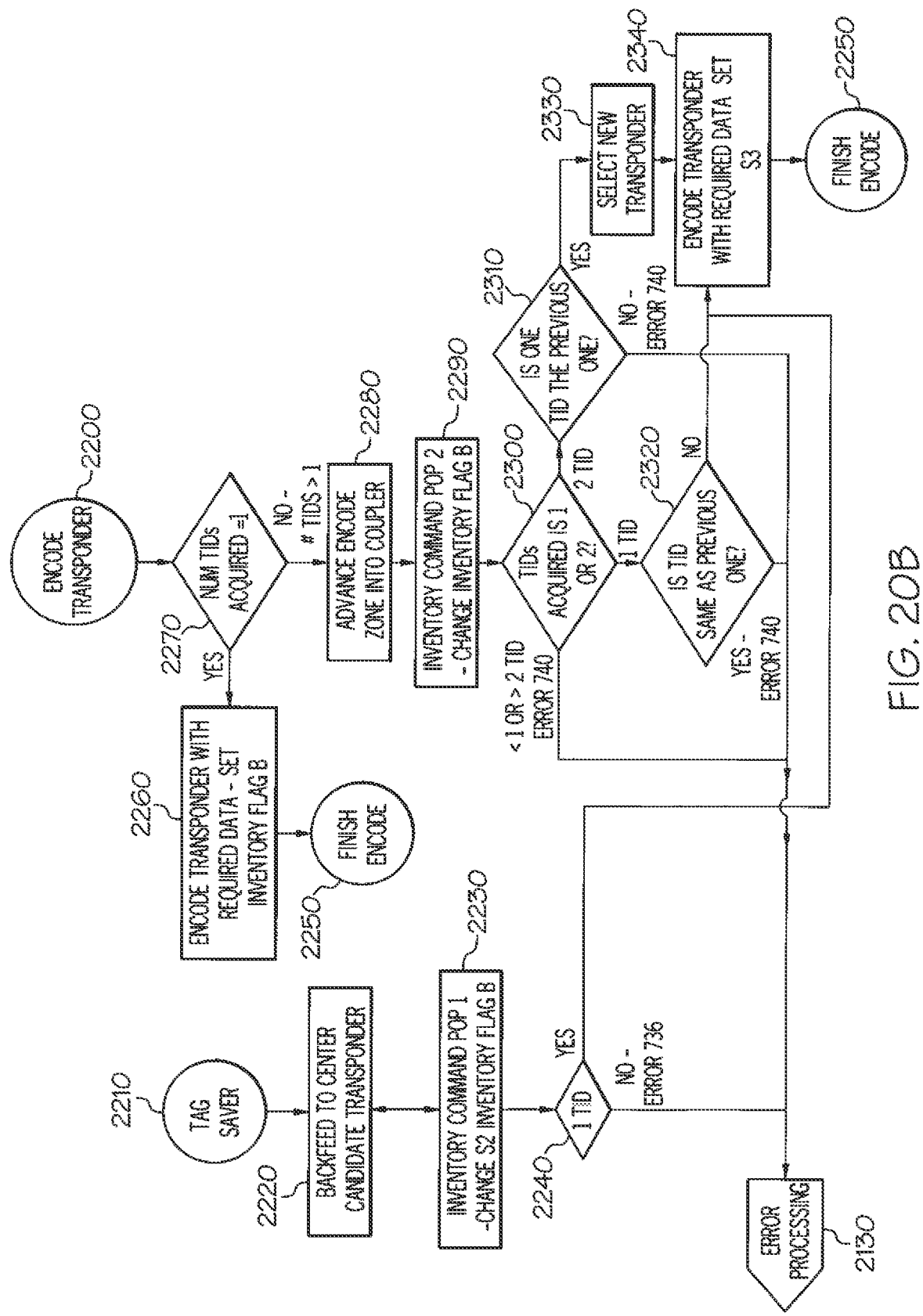

For encoding the transponder in 2200 we will proceed to 2270 to determine the number of transponders located as illustrated in FIG. 20B. If there was one transponder located, we encode it in 2260 and proceed to the finish encode in 2250. If the number of transponders in 2270 is greater than 1 we go to 2280 to advance the encode zone into the RFID encode antenna. If 2290 we perform another inventory with a transponder population set to 2. In 2300 we determine the number of transponders that responded. If the number is less than 1 or greater than 2 we record the error as 740 and proceed to error process 2130. If there was one tag responding in 2320 we determine if we have already seen this transponder. If we have, we record the error as 740 and proceed to error process 2130. Is this the first time we have seen this transponder we proceed to encoding in 2340. Backing up to step 2300 if two tags responded we processed to 2310 where we decide if one of the tags has been seen before. If not, we record the error as 740 and proceed to error process 2130. If we have seen on of the transponders before we proceed to select new transponder in 2330 and proceed to 2340 to encode transponder.

In 2340 we encode the transponder with the new data setting S3 and proceed to finish encoding in 2250.

Figure 21:
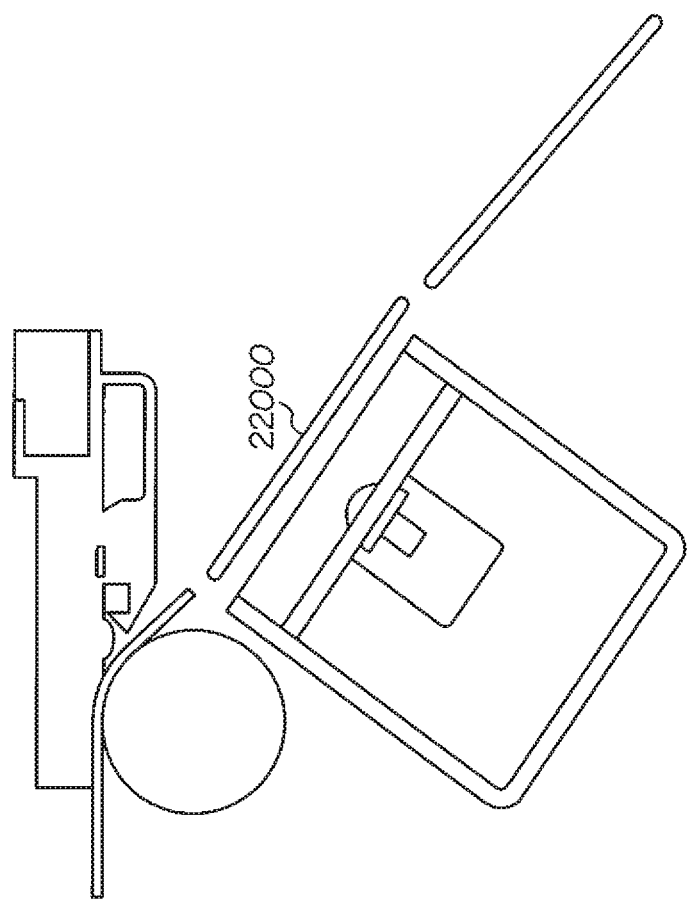
FIG. 21 illustrates a transponder of the thermal tabletop and industrial printer in an ideal encode location over the RFID encoder antenna in accordance with the disclosed architecture.

If after 2190 it was determined that the tag saver was desired by the user in 2210 we proceed to 2220 to reverse motion the transponder over the RFID encoding antenna show in FIG. 21 22000. The tag inventory with the transponder population set to 1 in 2230 is performed. If only 1 transponder responds we proceed to 2340 to encode the required data into the transponder. If there is any other response error 736 is recorded and we proceed to error processing 2130.

Figure 20C:
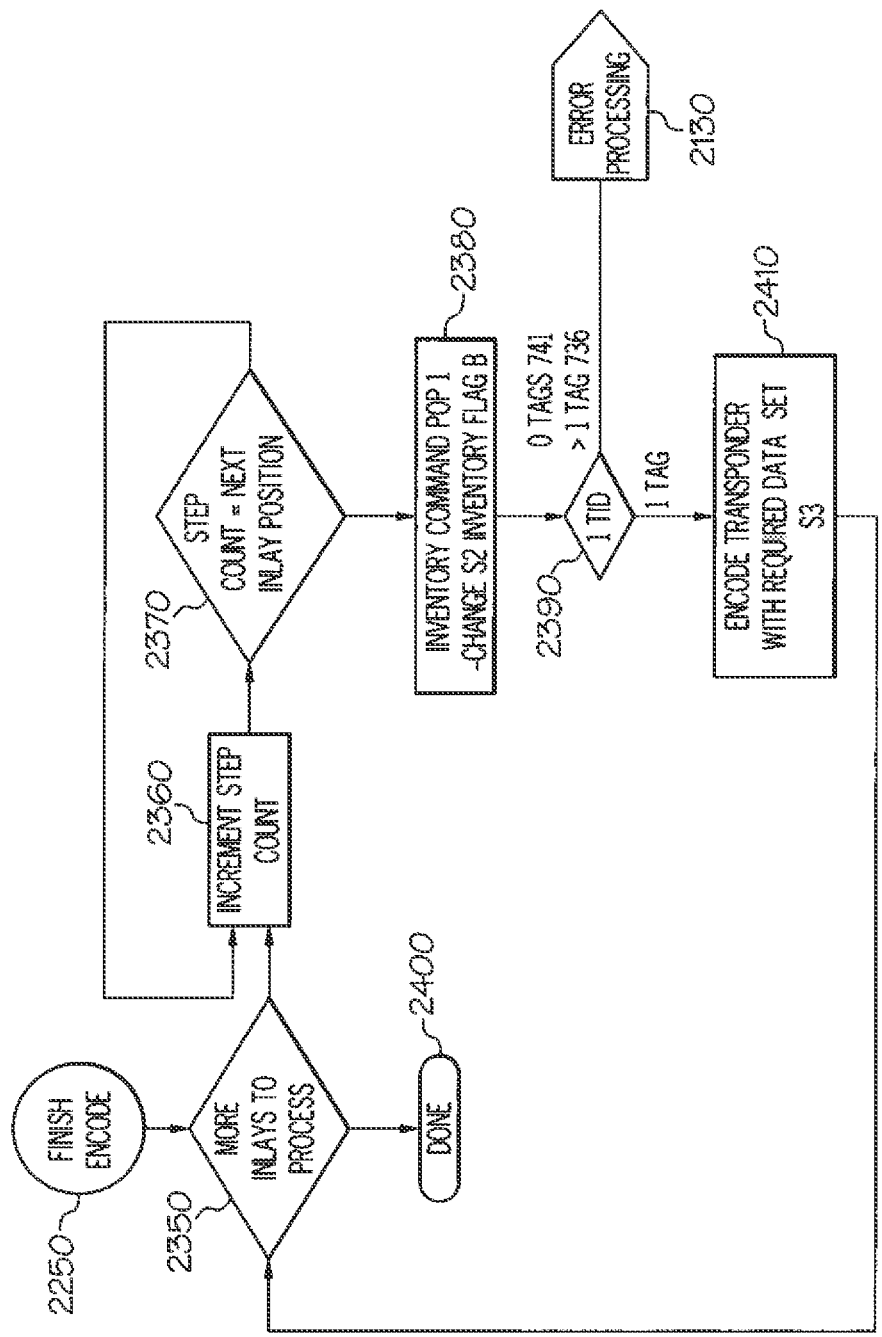

After 2130, the method proceeds to finish encode in 2250. A decision point is reached if we have more inlays to process as required by the user in 2350 as illustrated in FIG. 20C. If there is no decision point, then in step 2400 a done state is reached. If there are more inlays to process, we increment the step count 2360 for the RFID process and then look to see if the step count is equal to the next inlay position in 2370. If no, return to increment the step count. If yes, we do an inventory with a transponder population set to 1 setting S2 in step 2380. If there do a check in 2390 if we located 1 transponder. If we did in 2410 we encode the transponder with the required data and proceed to 2350 decision. If there is any other response, we set the error code to 741 or 736 and proceed to error processing 2130.

Figure 20D:
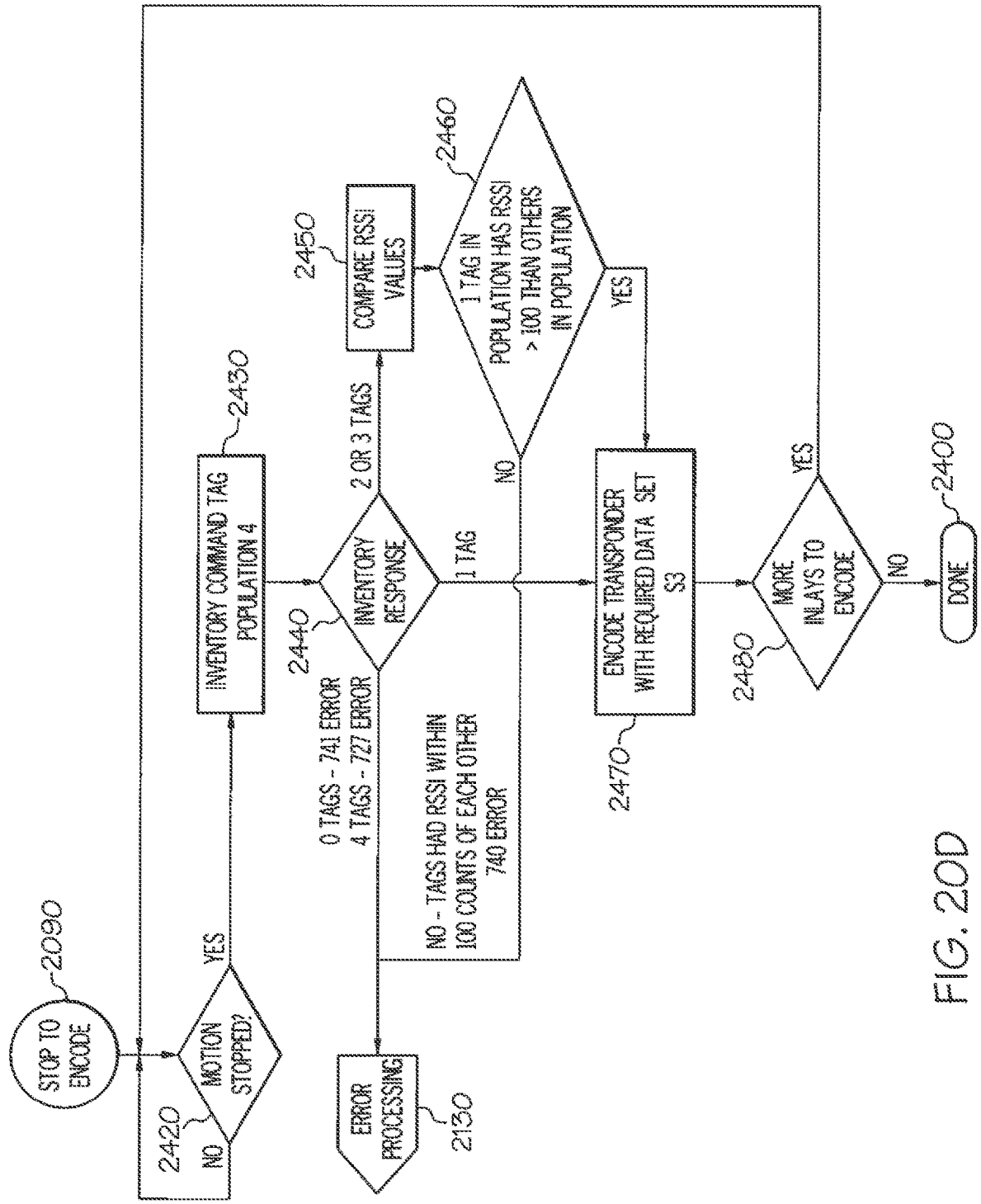

If at decision 2100 we took the stop to encode path this is the process as illustrated in FIG. 20D. In 2090 we proceed to determining if the motion is stopped in 2420. If no, we return wait. If yes, we proceed to 2430 and do a tag inventory with the population set to 4. If we received 0 or more than 4 tags responding in 2440 we mark the error code and proceed to error process 2130. If there was 1 tag, we proceed to 2470. If we received 2 or 3 tags, we compare the RSSI value at 2450. In 2480 we check to see if we have an RSSI value of on tag that is at 100 count greater than the other tags. If no, we mark the error code 740 and proceed to error process 2130. If yes, we proceed to 2470 and encode with the required data.

In 2480 we determine if there are more transponders to encode if yes we return to decision point 2420. If no, we proceed to a done state at 2400.

Figure 20E:
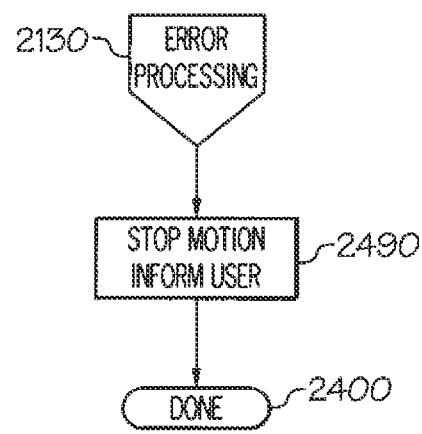

The error process as illustrated in FIG. 20E is brief; at 2130 we enter the error process. On 2490 we stop motion of printer 100 and inform the user there is an error then proceed to the done state 2400.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A commercial printer device for printing on and electronically encoding and verifying one or more radio frequency identification (RFID) labels, tags, or stickers attached to a continuous web, comprising:
   a print head capable of printing on the continuous web; and
   an RFID reader/writer configured to electronically encode the RFID label, tag, or sticker with data while the continuous web is moving;
   wherein the printer device can read and encode and print on the RFID label, tag, or sticker without damaging the RFID tag; and
   wherein the printer is configured to send as one command: write EPC, write access, and read EPC.

2. The printer device of claim 1, wherein encoding and printing occurs substantially simultaneously.

3. The printer device of claim 2, further comprising a second RFID reader/writer module that verifies the data encoded to the RFID label, tag, or sticker.

4. The printer device of claim 3, wherein the second RFID reader/writer module is individually controlled from the RFID reader/writer module that electronically encodes the RFID label, tag, or sticker, such that the printer device can encode and verify simultaneously.

5. The printed device of claim 4, further comprising a lighted sensor array that automatically detects aperture sense marks on the continuous web to correctly index printing to the RFID label, tag, or sticker.

6. The printer device of claim 1, further comprising a main processor and an NFC I$^2$C inlay for the purposes of communicating with the main processor.

7. The printer device of claim 1, wherein the print head automatically detects dot density.

8. The printer of claim 1, further comprising supply guides and a UHF temperature inlay contained under the supply guides for the purpose of reading the printer's temperature and using the temperature for optimizing printer performance.

9. The printer device of claim 1, wherein the print head can accept input information from Portable Document Format (PDF) or Personalized Print Markup Language (PPML).

10. The printer device of claim 1, wherein the continuous web is arranged in a sheet or roll form so that the RFID tags can be printed or encoded as part of a continuous process without stopping the web motion.

11. A method, comprising:
   providing a commercial printer device configured for printing on and electronically encoding and verifying a radio frequency identification (RFID) label, tag, or sticker attached to a continuous web, the commercial printer device comprising
   a print head capable of printing on the continuous web, and
   an RFID reader/writer;
      using the commercial printer device, sending as one command, write EPC, write access, and read EPC,
      wherein the RFID reader/writer electronically encodes the RFID label, tag, or sticker with data while the continuous web is moving, and
      wherein the commercial printer device reads, encodes, and prints on the RFID label, tag, or sticker without damaging the RFID label, tag, or sticker.

12. The method of claim 11, further comprising:
   using the commercial printer device, encoding and verifying in a sequential manner, substantially simultaneously or simultaneously, and
   using the commercial printer device, reading, encoding, and printing on the RFID label, tag, or sticker without damaging the RFID label, tag, or sticker.

13. The method of claim 11, further comprising:
   using a second RFID reader/writer of the commercial printer device, verifying the data encoded to the RFID label, tag, or sticker, wherein the second RFID reader/writer is individually controlled from the RFID reader/writer that electronically encodes the RFID label, tag, or sticker.

14. The method of claim 11, further comprising:
feeding a label in position;
fetching EPC data from memory;
generating a program command with an EPC data packet;
sending a packet to an RFID module;
receiving an RFID module response packet;
extracting response data from the packet; and
decoding the response data.

15. The method of claim 11, wherein the printer device further comprises a lighted sensor array, the method further comprising:
Using the lighted sensor array, automatically detecting aperture sense marks on the continuous web to correctly index printing to the RFID label, tag, or sticker.

16. The method of claim 11, wherein the printer device further comprises a NFC I2C inlay for the purposes of communicating with a main processor.

17. The method of claim 11, wherein the print head is a thermal print head that automatically detects dot density.

18. The method of claim 11, wherein the printer device further comprises a UHF temperature inlay contained under supply guides for the purpose of reading the printer's temperature and using the temperature for optimizing printer performance.

19. The method of claim 11, wherein, the print head can accept input information from Portable Document Format (PDF) Personalized Print Markup Language (PPML) or JSON (Java Script Object Notation).

20. The method of claim 11, wherein the continuous web is arranged in a sheet or roll form so that the RFID tags can be printed or encoded as part of a continuous process without stopping the web motion.

21. The method of claim 11, further comprising determining whether the RFID reader/writer responded with an error.

22. The method of claim 21, wherein when the RFID reader/writer did respond with an error, then the process further comprises:
decoding and displaying error message on an LCD screen; and
feeding and printing overstrike image on label.

23. The method of claim 21, wherein the RFID reader/writer did not respond with an error, then the process further comprises: feeding and printing image defined by format and batch data on label.

24. The method of claim 11, wherein after the image is fed and printed, the process reverts to a prior operation and a label is fed into position.

25. The method of claim 11, further comprising, using the RFID reader/writer, determining whether an RFID transponder is within its field by reading the RFID transponder's identification code.

26. The method of claim 11, further comprising, using the RFID reader/writer, encoding at least one RFID label, tag, or sticker with data while the web is moving.

27. The method of claim 11, further comprising, using a second RFID reader/writer, verifying that the data has been programmed into the RFID transponder and that the data was correctly written into the RFID transponder.

* * * * *